US012669789B2

(12) United States Patent
Evans et al.

(10) Patent No.: US 12,669,789 B2
(45) Date of Patent: Jun. 30, 2026

(54) SYSTEMS AND METHODS FOR CONNECTING, REMOTELY MONITORING AND CONTROLLING ENTITY SYSTEMS

(71) Applicant: Building Data Intelligence, Inc., Jupiter, FL (US)

(72) Inventors: Chris Haslan Evans, Indian Harbour Beach, FL (US); Mark Stephen Glynn, Franklin, TN (US)

(73) Assignee: Building Data Intelligence, Inc., Jupiter, FL (US)

( * ) Notice: Subject to any disclaimer, the term of this patent is extended or adjusted under 35 U.S.C. 154(b) by 379 days.

(21) Appl. No.: 18/095,842

(22) Filed: Jan. 11, 2023

(65) Prior Publication Data

US 2023/0315036 A1 Oct. 5, 2023

Related U.S. Application Data

(60) Provisional application No. 63/298,453, filed on Jan. 11, 2022.

(51) Int. Cl.
*G05B 19/042* (2006.01)
*H04Q 9/00* (2006.01)

(52) U.S. Cl.
CPC .. *G05B 19/042* (2013.01); *G05B 2219/25011* (2013.01)

(58) Field of Classification Search
CPC ........ G05B 19/042; G05B 2219/25011; H04L 67/10; H04L 67/125; H04L 67/12; H04Q 9/00; G06N 20/00
See application file for complete search history.

(56) References Cited

U.S. PATENT DOCUMENTS

| 8,204,717 B2 * | 6/2012 | McLaughlin | ...... G05B 19/4183 |
| 10,299,091 B2 * | 5/2019 | Schoppmeier | .......... H04W 4/70 |

(Continued)

FOREIGN PATENT DOCUMENTS

| CN | 110703616 A | * | 1/2020 | ............. G05B 15/02 |
| KR | 20130136620 A | * | 12/2013 | ............. G05B 23/00 |

OTHER PUBLICATIONS

Edel O'Shea, Niagara framework: an overview, Jan. 28, 2021, retrieved from—https://www.ibc.ie/niagara-framework-an-overview/, 8 pages (Year: 2021).*

(Continued)

*Primary Examiner* — Yongjia Pan
(74) *Attorney, Agent, or Firm* — Dentons US LLP

(57) ABSTRACT

A method of executing remote monitoring and controlling of a plurality of entities using a cloud-based platform. The method includes: connecting a first entity to a network system; providing a data system connected between the network system and a cloud server; receiving first equipment data and first sensor data from the first entity; generating tagged first equipment data and tagged first sensor data; transmitting the tagged first equipment data and the tagged first sensor data to the cloud server; normalizing the tagged first equipment data and the tagged first sensor data by converting the tagged first equipment and the tagged first sensor data into standardized first equipment data and standardized first sensor data; generating a first digital representation of the first entity based on the standardized first equipment data and the standardized first sensor data; and transmitting display data of the first digital representation to a user interface.

20 Claims, 27 Drawing Sheets

Tagging the OEM labels for standardization

Example of Tagging Structure (System / Device Breakdown)

Example of a Sensor Data Point from an Air Handling Limit in Building 1 on Site A Example payload

(56)                References Cited

U.S. PATENT DOCUMENTS

| | | | | |
|---|---|---|---|---|
| 11,087,890 | B2* | 8/2021 | Turrin | G16Y 40/35 |
| 2003/0109942 | A1* | 6/2003 | Yeh | G05B 23/0264 |
| | | | | 700/83 |
| 2005/0007249 | A1* | 1/2005 | Eryurek | G05B 23/027 |
| | | | | 340/511 |
| 2010/0257228 | A1* | 10/2010 | Staggs | G06F 9/5027 |
| | | | | 700/7 |
| 2011/0175701 | A1* | 7/2011 | Kobayashi | G06F 3/1454 |
| | | | | 340/3.7 |
| 2014/0047107 | A1* | 2/2014 | Maturana | G05B 19/056 |
| | | | | 709/224 |
| 2014/0337429 | A1* | 11/2014 | Asenjo | H04L 67/10 |
| | | | | 709/204 |
| 2016/0012707 | A1* | 1/2016 | Mckinley | G08B 25/10 |
| | | | | 340/679 |
| 2016/0112283 | A1* | 4/2016 | Maturana | G05B 15/02 |
| | | | | 709/224 |
| 2016/0212218 | A1* | 7/2016 | Dubois | H04L 63/0428 |
| 2016/0274558 | A1* | 9/2016 | Strohmenger | G05B 15/02 |
| 2017/0060911 | A1* | 3/2017 | Loscalzo | G06F 16/258 |
| 2018/0052451 | A1* | 2/2018 | Billi-Duran | G05B 19/41835 |
| 2019/0354922 | A1* | 11/2019 | Berti | G06K 7/1417 |
| 2020/0133256 | A1 | 4/2020 | Cella | |
| 2020/0174464 | A1 | 6/2020 | Cella | |
| 2020/0225655 | A1* | 7/2020 | Cella | G05B 23/0221 |
| 2020/0287775 | A1* | 9/2020 | Khasis | H04L 63/105 |
| 2020/0348662 | A1 | 11/2020 | Cella | |
| 2021/0133650 | A1 | 5/2021 | Cella | |
| 2021/0157312 | A1 | 5/2021 | Cella | |
| 2023/0009093 | A1* | 1/2023 | De Caigny | H04L 41/145 |

OTHER PUBLICATIONS

International Search Report and Written Opinion dated Apr. 18, 2023 in related application PCT/US23/10619 filed Jan. 11, 2023 (5 pages).

* cited by examiner

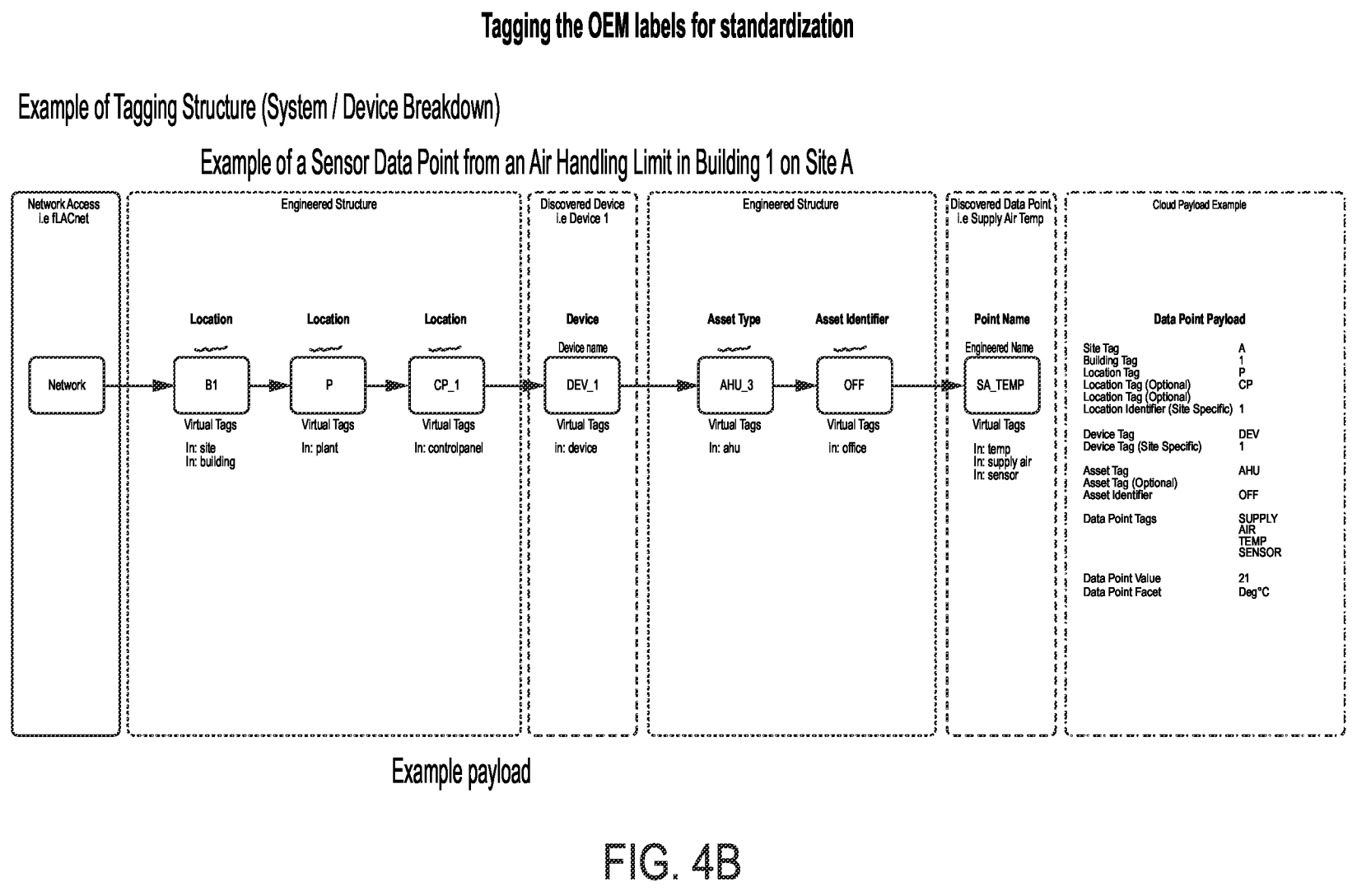

Tagging the OEM labels for standardization

Example of Tagging Structure (System / Device Breakdown)

Example of a Sensor Data Point from an Air Handling Limit in Building 1 on Site A

Network Access
i.e fLACnet

Network

Engineered Structure

| Location | Location | Location | Device | Asset Type | Asset Identifier | Point Name |
|----------|----------|----------|--------|------------|------------------|------------|
| | | | Device name | | | Engineered Name |
| B1 | P | CP_1 | DEV_1 | AHU_3 | OFF | SA_TEMP |
| Virtual Tags | Virtual Tags | Virtual Tags | Virtual Tags | Virtual Tags | Virtual Tags | Virtual Tags |
| in: site in: building | in: plant | in: controlpanel | in: device | in: ahu | in: office | in: temp in: supply air in: sensor |

Discovered Device
i.e Device 1

Discovered Data Point
i.e Supply Air Temp

Cloud Payload Example

| | Data Point Payload |
|---|---|
| Site Tag | A |
| Building Tag | 1 |
| Location Tag | P |
| Location Tag (Optional) | CP |
| Location Tag (Optional) | |
| Location Identifier (Site Specific) | 1 |
| Device Tag | DEV |
| Device Tag (Site Specific) | 1 |
| Asset Tag | AHU |
| Asset Tag (Optional) | |
| Asset Identifier | OFF |
| Data Point Tags | SUPPLY AIR TEMP SENSOR |
| Data Point Value | 21 |
| Data Point Facet | Deg °C |

Example payload

FIG. 4B

Software and Services Platform

ISS Key Technologies

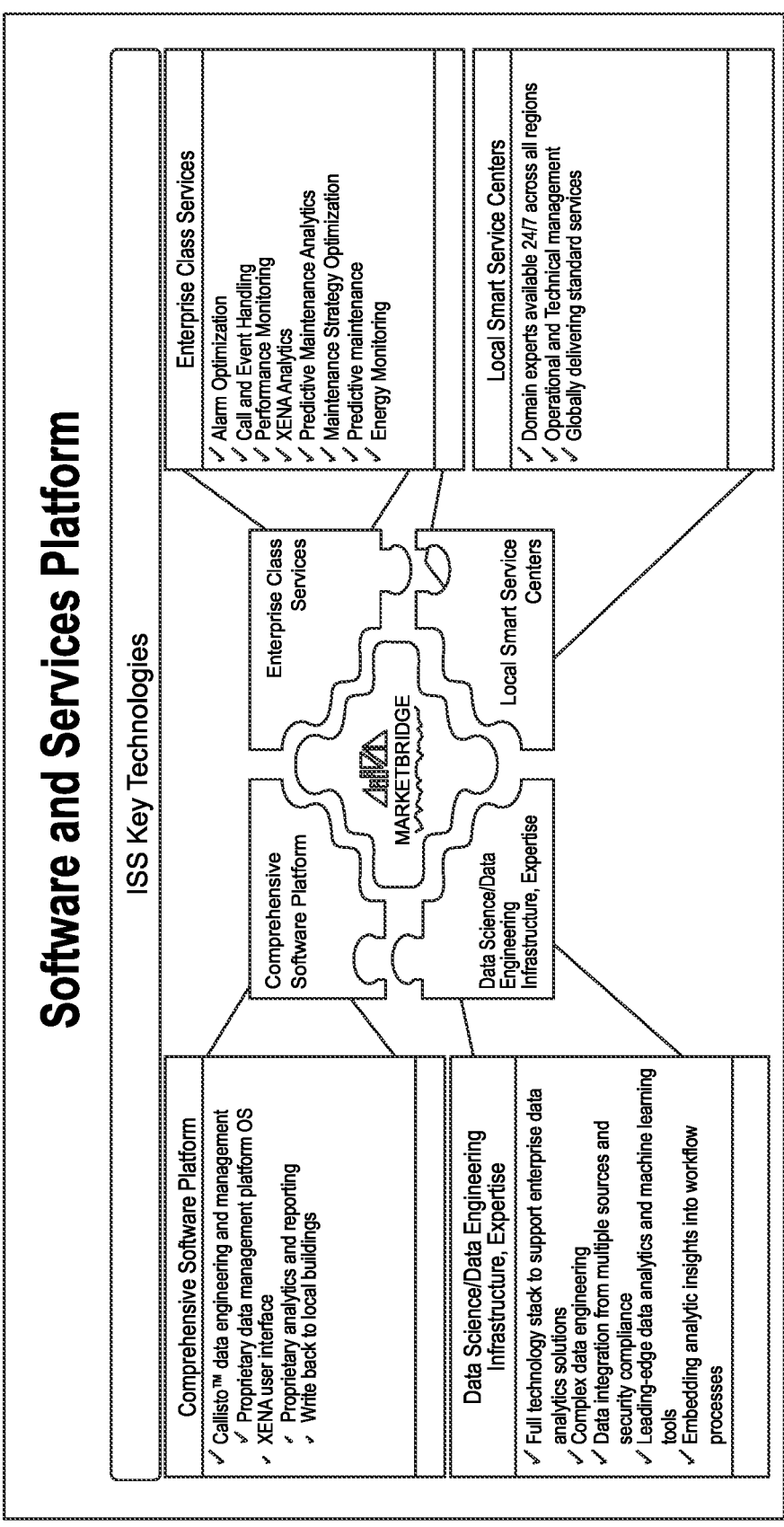

Enterprise Class Services

- ✓ Alarm Optimization
- ✓ Call and Event Handling
- ✓ Performance Monitoring
- ✓ XENA Analytics
- ✓ Predictive Maintenance Analytics
- ✓ Maintenance Strategy Optimization
- ✓ Predictive maintenance
- ✓ Energy Monitoring

Local Smart Service Centers

- ✓ Domain experts available 24/7 across all regions
- ✓ Operational and Technical management
- ✓ Globally delivering standard services

Comprehensive Software Platform

- ✓ Callisto™ data engineering and management
- ✓ Proprietary data management platform OS
- ✓ XENA user interface
- ✓ Proprietary analytics and reporting
- ✓ Write back to local buildings

Data Science/Data Engineering Infrastructure, Expertise

- ✓ Full technology stack to support enterprise data analytics solutions
- ✓ Complex data engineering
- ✓ Data integration from multiple sources and security compliance
- ✓ Leading-edge data analytics and machine learning tools
- ✓ Embedding analytic insights into workflow processes Enterprise Class Services Local Smart Service Centers Comprehensive Software Platform Data Science/Data Engineering Infrastructure, Expertise

MARKETBRIDGE

FIG. 4E

*MB-ISS Services Portfolio*

Modular Approach to Expand Value Delivered

*Alarm Optimization*

Alarm Optimization focuses on the most relevant BMS alarms and identifies and resolves their root causes

*XENA Analytics*

Analytics takes a systematic approach to test, verify, optimize, and maintain system performance through data-driven analytics and onsite scheduled O&M

*Call & Event Handling*

The engineers on duty will assist you online in solving technical problems related to the operation and maintenance of building control and management systems

*Maintenance Analytics*

Maintenance Analytics provides early indication and diagnosis of equipment faults that can be used as basis for decision to perform maintenance, both corrective and preventive

*Performance Monitoring*

XENA uses performance data and trends from the building automation system to identify, Facility Improvement Measures (FIMs) and implement them remotely

*Energy Audit*

MBISS will inspect in detail all the designated energy-related technical infrastructure components of the building which lead to potential energy savings

FIG. 4G

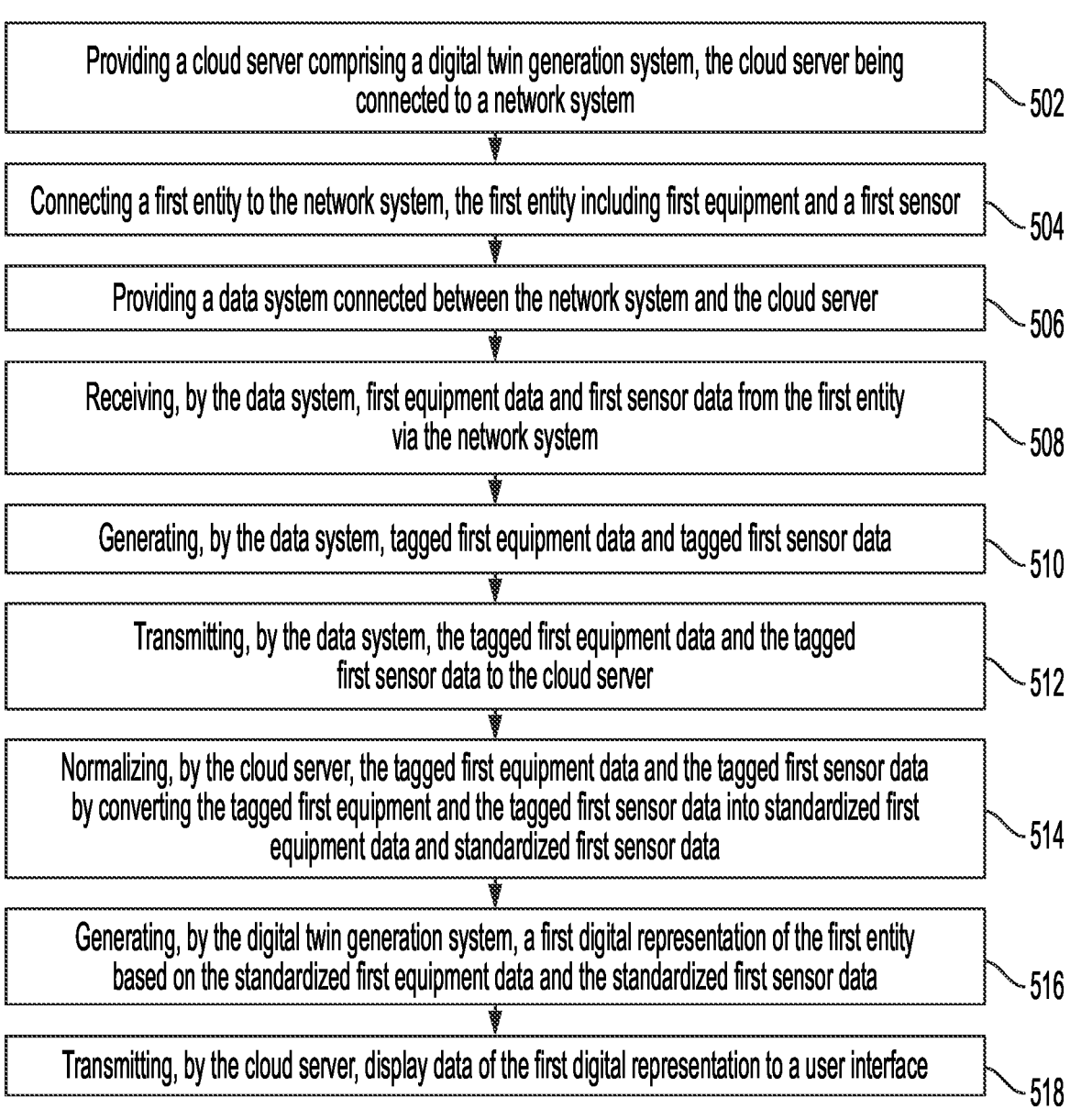

500

Providing a cloud server comprising a digital twin generation system, the cloud server being connected to a network system — 502

Connecting a first entity to the network system, the first entity including first equipment and a first sensor — 504

Providing a data system connected between the network system and the cloud server — 506

Receiving, by the data system, first equipment data and first sensor data from the first entity via the network system — 508

Generating, by the data system, tagged first equipment data and tagged first sensor data — 510

Transmitting, by the data system, the tagged first equipment data and the tagged first sensor data to the cloud server — 512

Normalizing, by the cloud server, the tagged first equipment data and the tagged first sensor data by converting the tagged first equipment and the tagged first sensor data into standardized first equipment data and standardized first sensor data — 514

Generating, by the digital twin generation system, a first digital representation of the first entity based on the standardized first equipment data and the standardized first sensor data — 516

Transmitting, by the cloud server, display data of the first digital representation to a user interface — 518

Figure 6A:
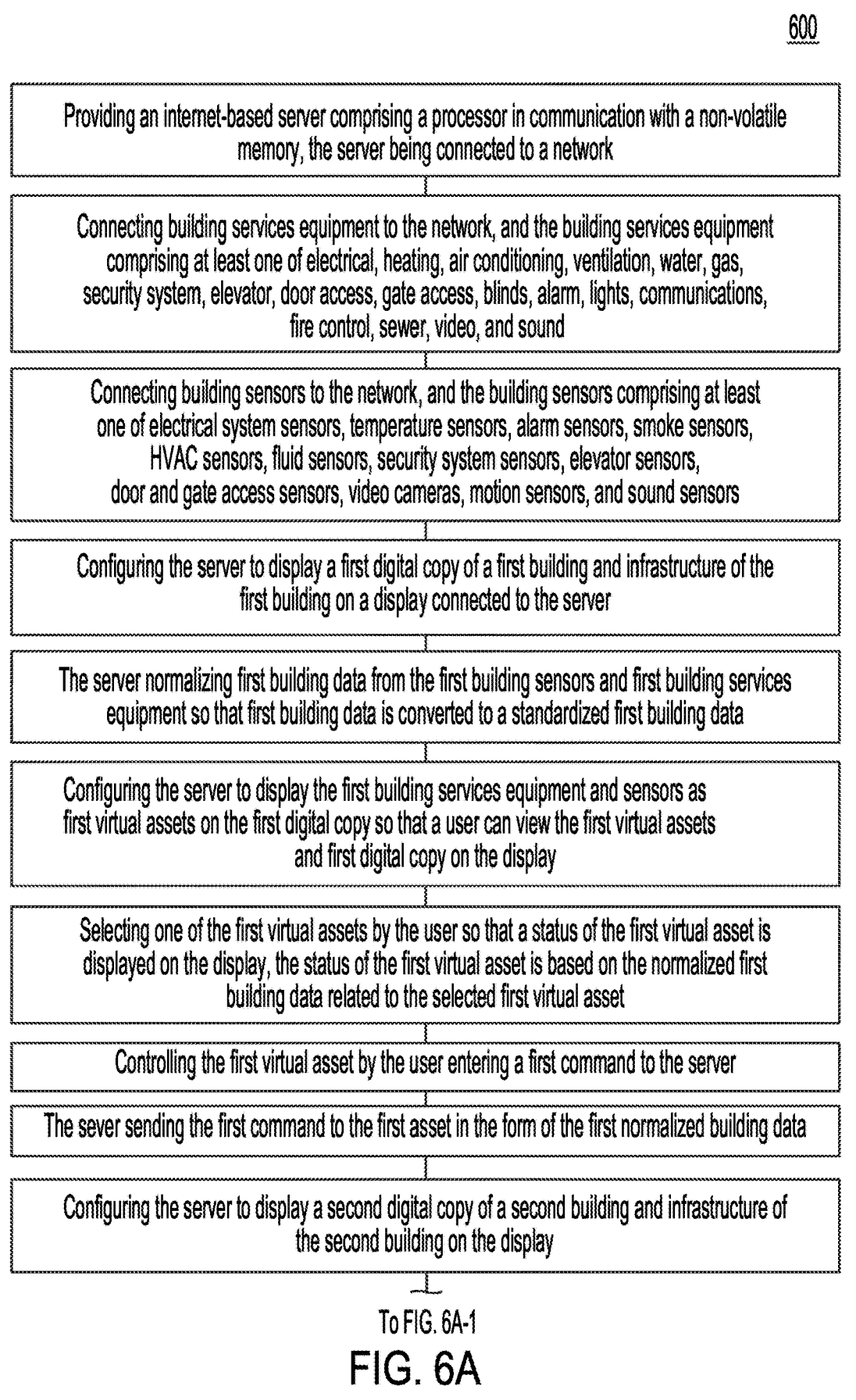

Providing an internet-based server comprising a processor in communication with a non-volatile memory, the server being connected to a network Connecting building services equipment to the network, and the building services equipment comprising at least one of electrical, heating, air conditioning, ventilation, water, gas, security system, elevator, door access, gate access, blinds, alarm, lights, communications, fire control, sewer, video, and sound Connecting building sensors to the network, and the building sensors comprising at least one of electrical system sensors, temperature sensors, alarm sensors, smoke sensors, HVAC sensors, fluid sensors, security system sensors, elevator sensors, door and gate access sensors, video cameras, motion sensors, and sound sensors Configuring the server to display a first digital copy of a first building and infrastructure of the first building on a display connected to the server The server normalizing first building data from the first building sensors and first building services equipment so that first building data is converted to a standardized first building data Configuring the server to display the first building services equipment and sensors as first virtual assets on the first digital copy so that a user can view the first virtual assets and first digital copy on the display Selecting one of the first virtual assets by the user so that a status of the first virtual asset is displayed on the display, the status of the first virtual asset is based on the normalized first building data related to the selected first virtual asset Controlling the first virtual asset by the user entering a first command to the server The sever sending the first command to the first asset in the form of the first normalized building data Configuring the server to display a second digital copy of a second building and infrastructure of the second building on the display To FIG. 6A-1

Figure 6A-1:
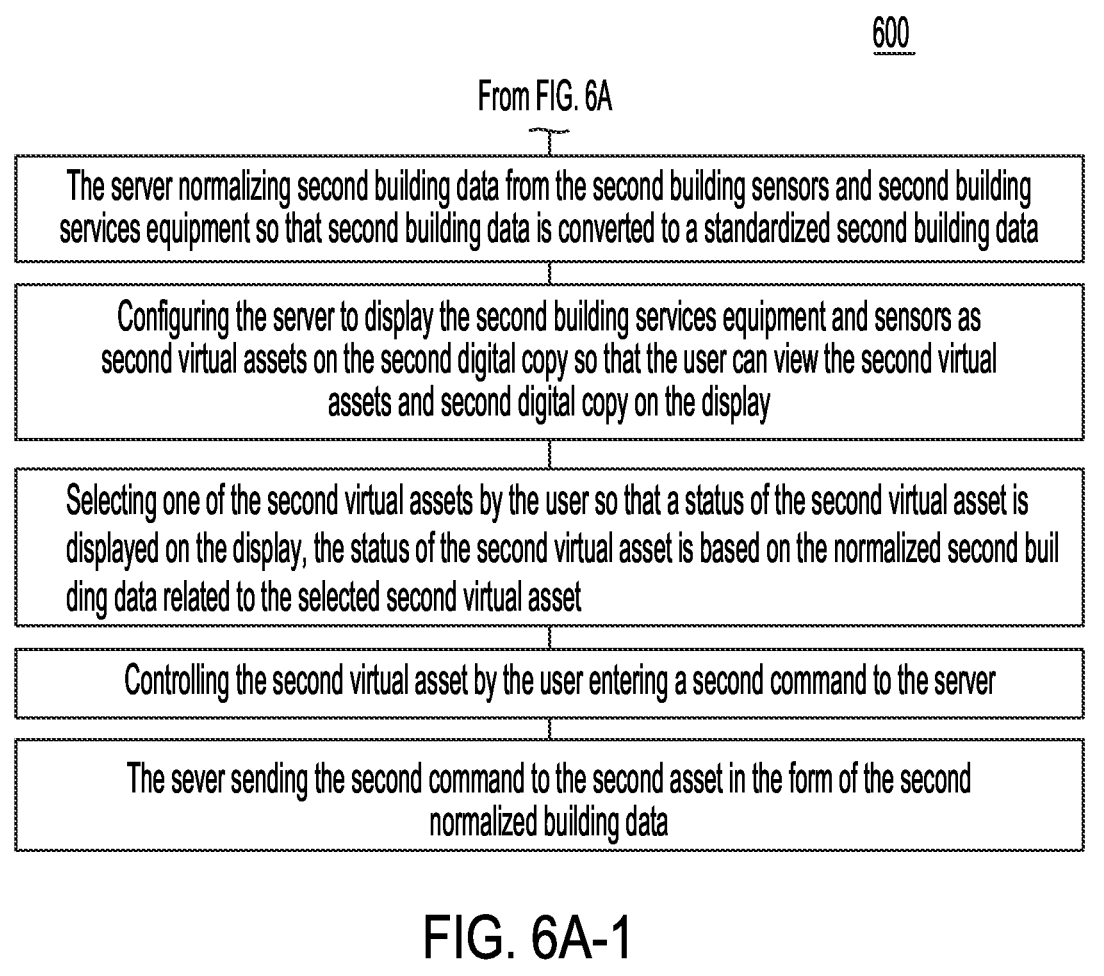

From FIG. 6A

The server normalizing second building data from the second building sensors and second building services equipment so that second building data is converted to a standardized second building data Configuring the server to display the second building services equipment and sensors as second virtual assets on the second digital copy so that the user can view the second virtual assets and second digital copy on the display Selecting one of the second virtual assets by the user so that a status of the second virtual asset is displayed on the display, the status of the second virtual asset is based on the normalized second building data related to the selected second virtual asset Controlling the second virtual asset by the user entering a second command to the server The sever sending the second command to the second asset in the form of the second normalized building data

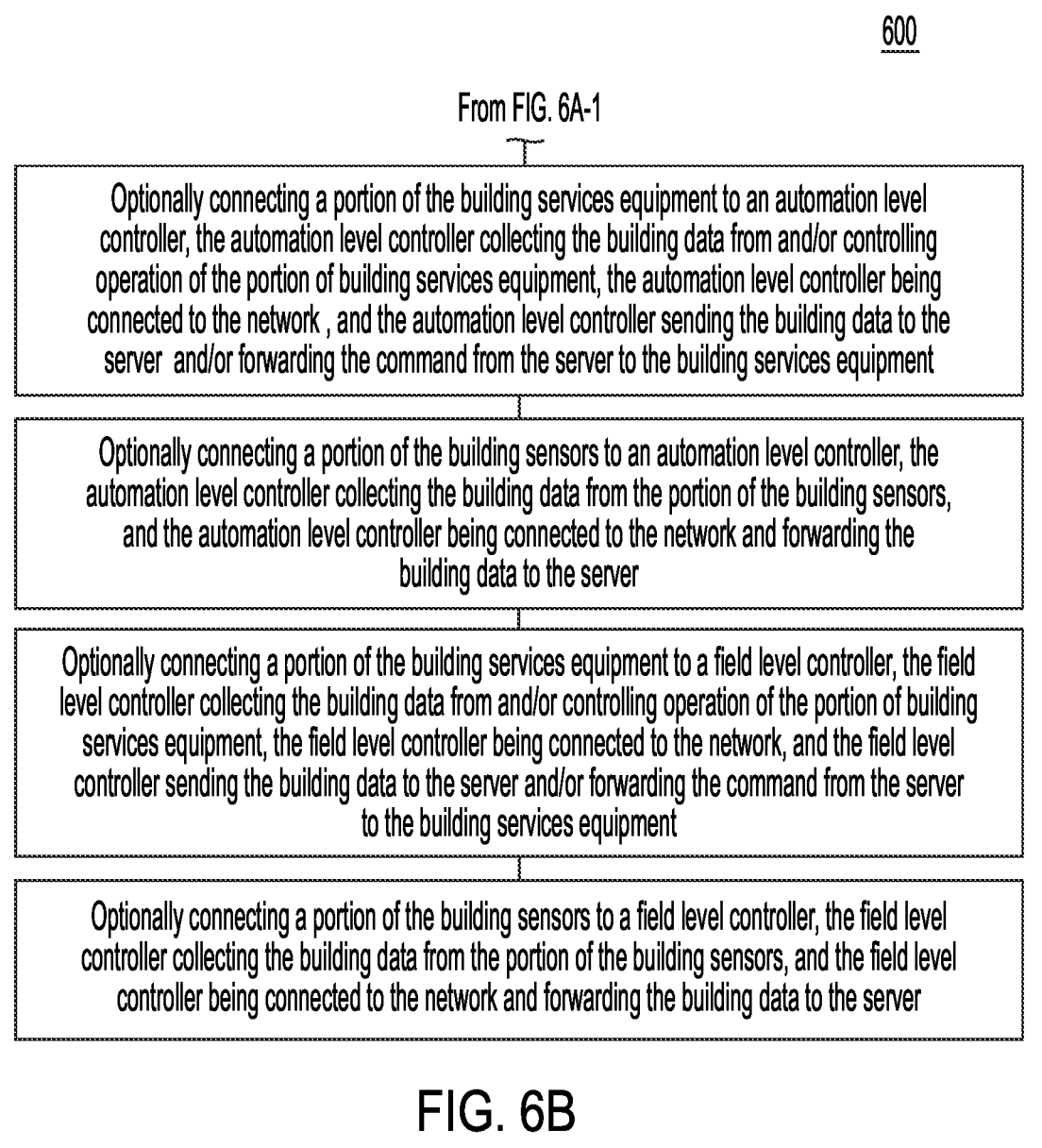

From FIG. 6A-1

Optionally connecting a portion of the building services equipment to an automation level controller, the automation level controller collecting the building data from and/or controlling operation of the portion of building services equipment, the automation level controller being connected to the network , and the automation level controller sending the building data to the server  and/or forwarding the command from the server to the building services equipment Optionally connecting a portion of the building sensors to an automation level controller, the automation level controller collecting the building data from the portion of the building sensors, and the automation level controller being connected to the network and forwarding the building data to the server Optionally connecting a portion of the building services equipment to a field level controller, the field level controller collecting the building data from and/or controlling operation of the portion of building services equipment, the field level controller being connected to the network, and the field level controller sending the building data to the server and/or forwarding the command from the server to the building services equipment Optionally connecting a portion of the building sensors to a field level controller, the field level controller collecting the building data from the portion of the building sensors, and the field level controller being connected to the network and forwarding the building data to the server

FIG. 6B

SYSTEMS AND METHODS FOR CONNECTING, REMOTELY MONITORING AND CONTROLLING ENTITY SYSTEMS

CROSS-REFERENCE TO RELATED APPLICATION

This application claims priority to and the benefit of U.S. Provisional Patent Application No. 63/298,453, filed Jan. 11, 2022, which is incorporated by reference herein in its entirety.

TECHNICAL FIELD

The present disclosure relates to systems and methods for connecting, remotely monitoring and controlling systems and devices across multiple entities with a single cloud-based application system.

BACKGROUND

Commercial buildings worldwide are valued at over U.S. $30 trillion with only about 0.5% of these buildings being deemed "smart". Over the next five years, surviving and successful commercial real estate owners and property managers must go through major digital transformations of their building(s) to reduce energy consumption, increase efficiency, reduce maintenance costs and improve carbon footprints and labor costs.

Through 2025 and beyond, it will be critical for global property management organizations to address these challenges, meet growing global ESG expectations, and improve the financial performance of individual properties. Technology advances over the last decade now make it possible to deliver an "information advantage" to building owners and operators.

Typical buildings generate thousands of data sets daily, such as by heating, ventilation and air conditioning (HVAC), lighting, water metering, air quality monitors, access points, security systems and many additional building components. The majority of this data is "siloed" by individual building, machine type, and vendor, so that proprietary software is required to utilize and interpret the data. Similarly, other entities or systems, for example, vehicles (e.g., motor vehicles, railed vehicles, spacecraft, etc.), manufacturing plants, and public service entities (e.g., utility companies, government agencies, etc.), have components and systems that generate e data sets that may be "siloed" into a data management system(s), which generally requires proprietary software to analyze and interpret the data.

Accordingly, there is a great need to integrate, analyze, and act on this data in real-time. However, what seems like a simple concept of connecting and analyzing building asset data has faced many hurdles including device labelling, lack of standard industry data models, and legacy local building management practices, or other entities described above.

The background description provided herein is for the purpose of generally presenting context of the disclosure. Unless otherwise indicated herein, the materials described in this section are not prior art to the claims in this application and are not admitted to be prior art, or suggestions of the prior art, by inclusion in this section.

SUMMARY OF THE DISCLOSURE

According to certain aspects of the present disclosure, systems and methods are disclosed for reducing energy consumption, increasing efficiency, reducing operating costs, reducing carbon footprints and reducing labor costs associated with operating entities. The entities may include buildings, vehicles, manufacturing plants, and public service entities, but are not limited thereto. Additionally, the present disclosure provides systems and methods that translate any type of vendor or manufacturer system data into a single data language to provide remote smart system management services for multiple entities to solve the many existing problems with conventional system management services.

One embodiment provides a method of executing remote monitoring and controlling of a plurality of entities using a cloud-based platform, the method comprising: providing a cloud server comprising a digital twin generation system, the cloud server being connected to a network system; connecting a first entity to the network system, the first entity including first equipment and a first sensor; providing a data system connected between the network system and the cloud server; receiving, by the data system, first equipment data and first sensor data from the first entity via the network system; generating, by the data system, tagged first equipment data and tagged first sensor data; transmitting, by the data system, the tagged first equipment data and the tagged first sensor data to the cloud server; normalizing, by the cloud server, the tagged first equipment data and the tagged first sensor data by converting the tagged first equipment and the tagged first sensor data into standardized first equipment data and standardized first sensor data; generating, by the digital twin generation system, a first digital representation of the first entity based on the standardized first equipment data and the standardized first sensor data; and transmitting, by the cloud server, display data of the first digital representation to a user interface.

One embodiment provides a system comprising: a cloud server comprising a digital twin generation system; a network system connected to the cloud server; a data system connected between the network system and the cloud server; and one or more computer readable media storing instructions for executing remote monitoring and controlling of a plurality of entities using a cloud-based platform; and one or more processors configured to execute the instructions to perform operations comprising: connecting a first entity to the network system, the first entity including first equipment and a first sensor; receiving, by the data system, first equipment data and first sensor data from the first entity via the network system; generating, by the data system, tagged first equipment data and tagged first sensor data; transmitting, by the data system, the tagged first equipment data and the tagged first sensor data to the cloud server; normalizing, by the cloud server, the tagged first equipment data and the tagged first sensor data by converting the tagged first equipment and the tagged first sensor data into standardized first equipment data and standardized first sensor data; generating, by the digital twin generation system, a first digital representation of the first entity based on the standardized first equipment data and the standardized first sensor data; transmitting, by the cloud server, display data of the first digital representation to a user interface.

One embodiment provides a non-transitory computer-readable medium storing instructions for executing remote monitoring and controlling of a plurality of entities using a cloud-based platform, the instructions, when executed by one or more processors, causing the one or more processors to perform operations comprising: connecting a cloud server comprising a digital twin generation system to a network system; connecting a first entity to the network system, the first entity including first equipment and a first sensor;

3 connecting a data system between the network system and the cloud server; receiving, by the data system, first equipment data and first sensor data from the first entity via the network system; generating, by the data system, tagged first equipment data and tagged first sensor data; transmitting, by the data system, the tagged first equipment data and the tagged first sensor data to the cloud server; normalizing, by the cloud server, the tagged first equipment data and the tagged first sensor data by converting the tagged first equipment and the tagged first sensor data into standardized first equipment data and standardized first sensor data; generating, by the digital twin generation system, a first digital representation of the first entity based on the standardized first equipment data and the standardized first sensor data; transmitting, by the cloud server, display data of the first digital representation to a user interface.

Additional objects and advantages of the disclosed embodiments will be set forth in part in the description that follows, and in part will be apparent from the description, or may be learned by practice of the disclosed embodiments. The objects and advantages of the disclosed embodiments will be realized and attained by means of the elements and combinations particularly pointed out in the appended claims. It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

4

Figure 2A:
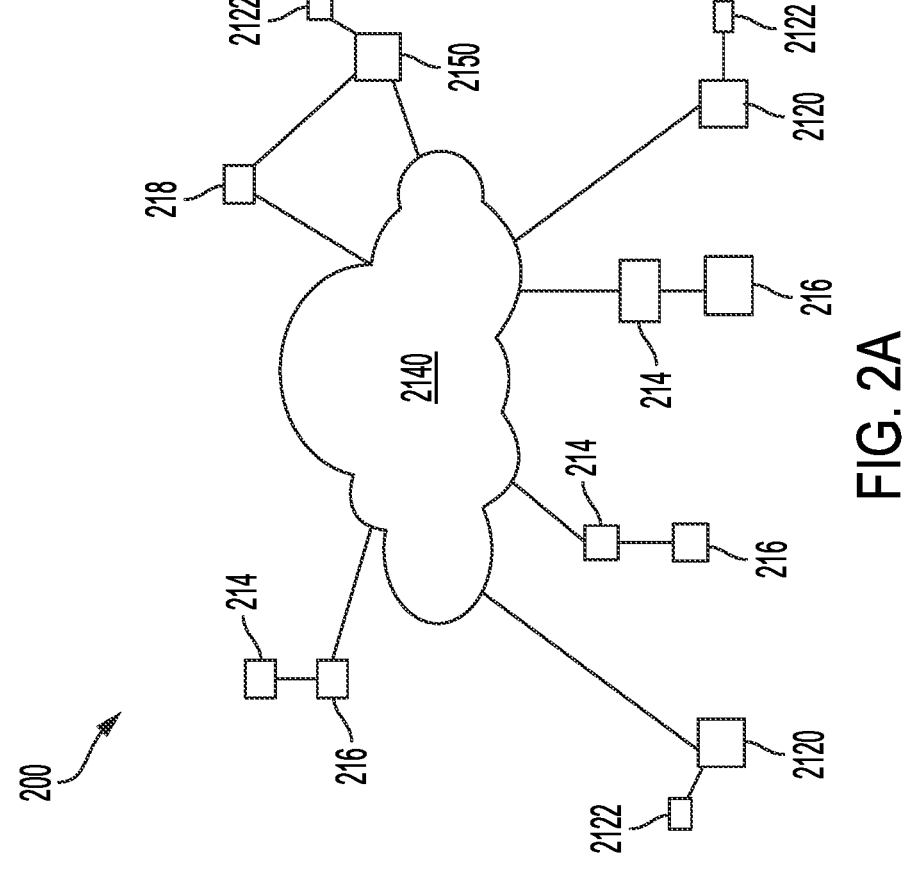
FIG. 2A illustrates a block diagram of an exemplary digital building operating system, according to one aspect of the present disclosure.
Figure 2B:
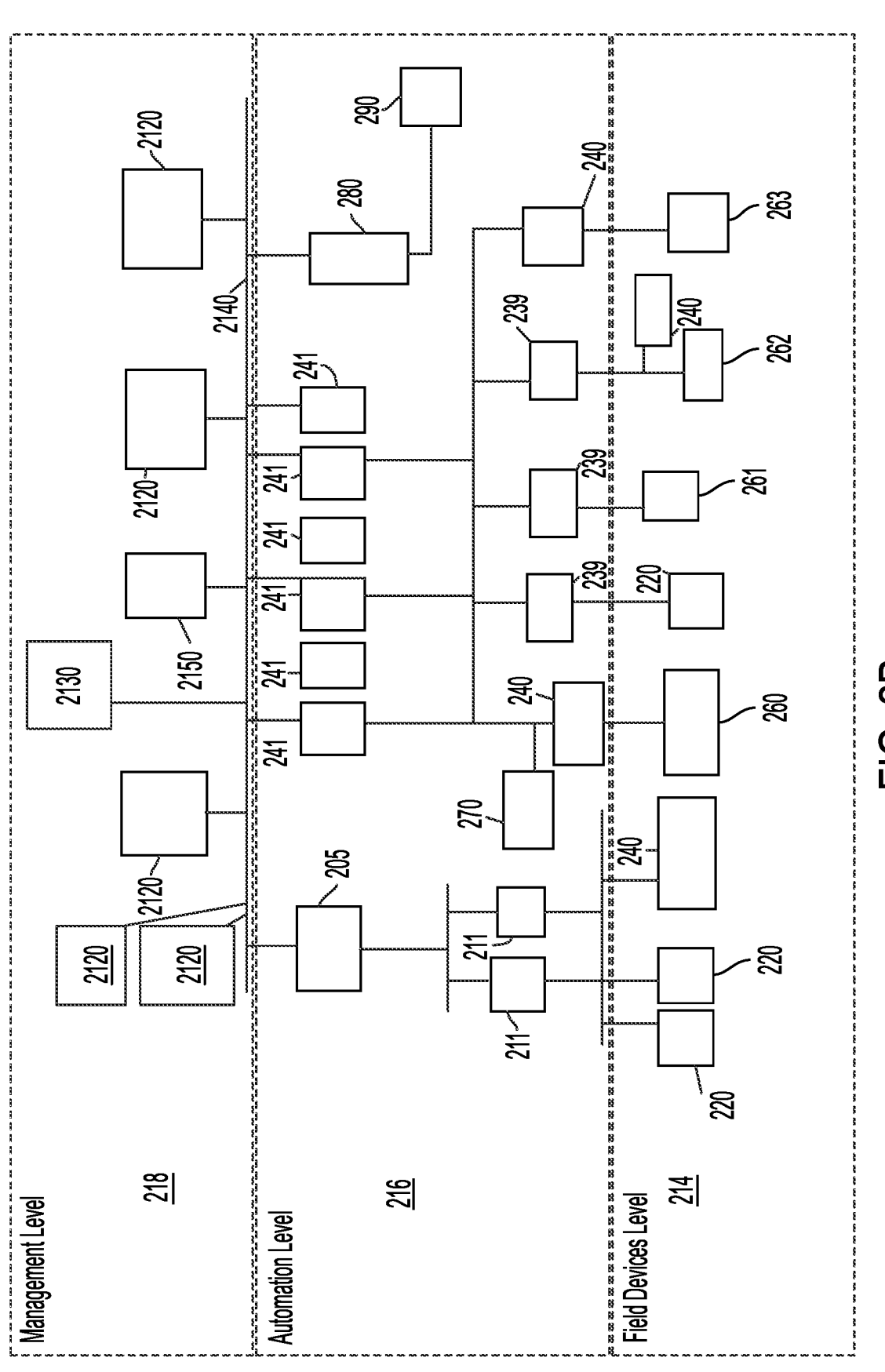
FIG. 2B illustrates a block diagram of an exemplary integration scheme for a digital building operation system, according to one aspect of the present disclosure.
Figure 2C:
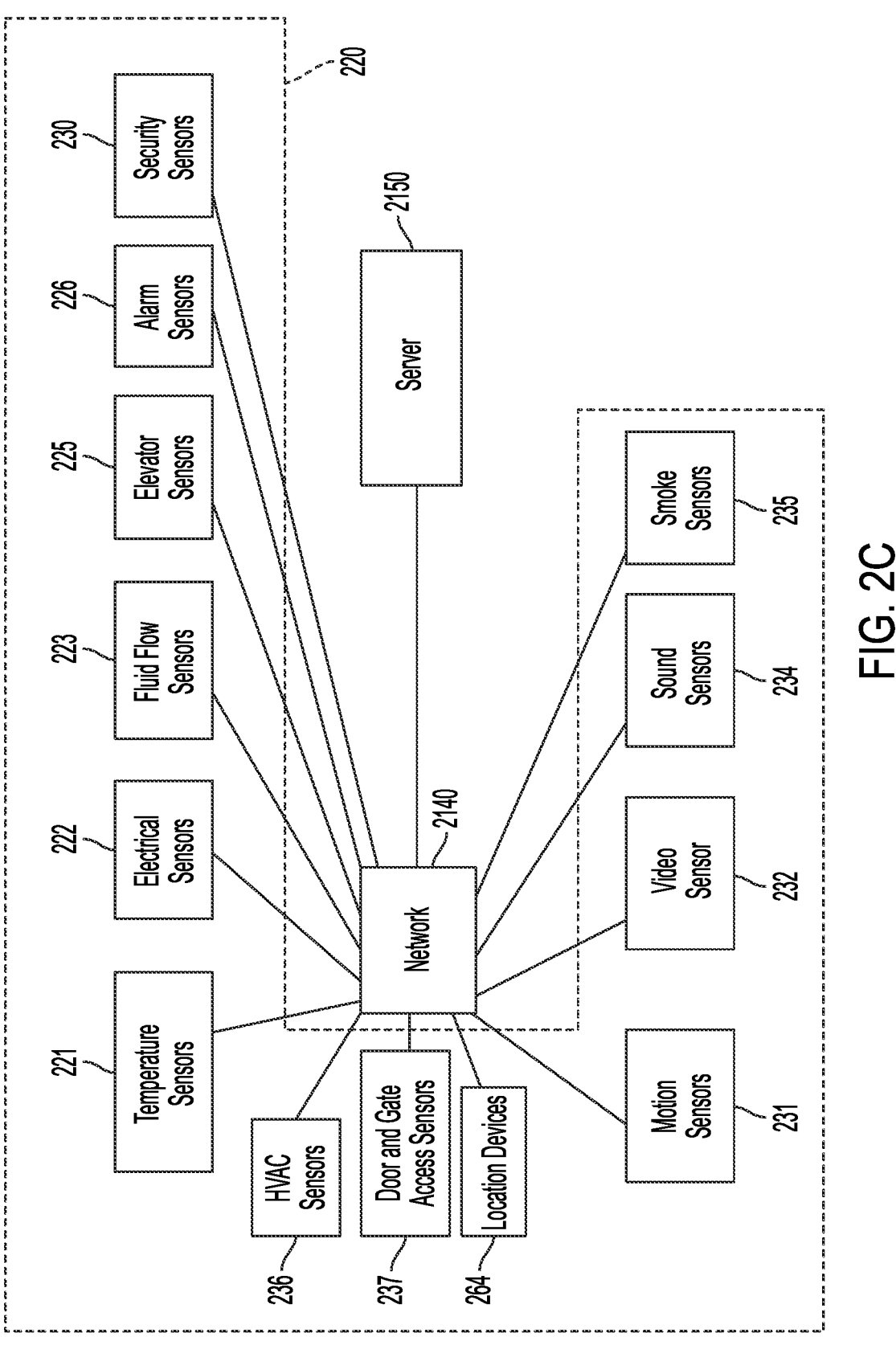
FIG. 2C illustrates a block diagram of exemplary building sensors connected to a network, according to one aspect of the present disclosure.
Figure 2D:
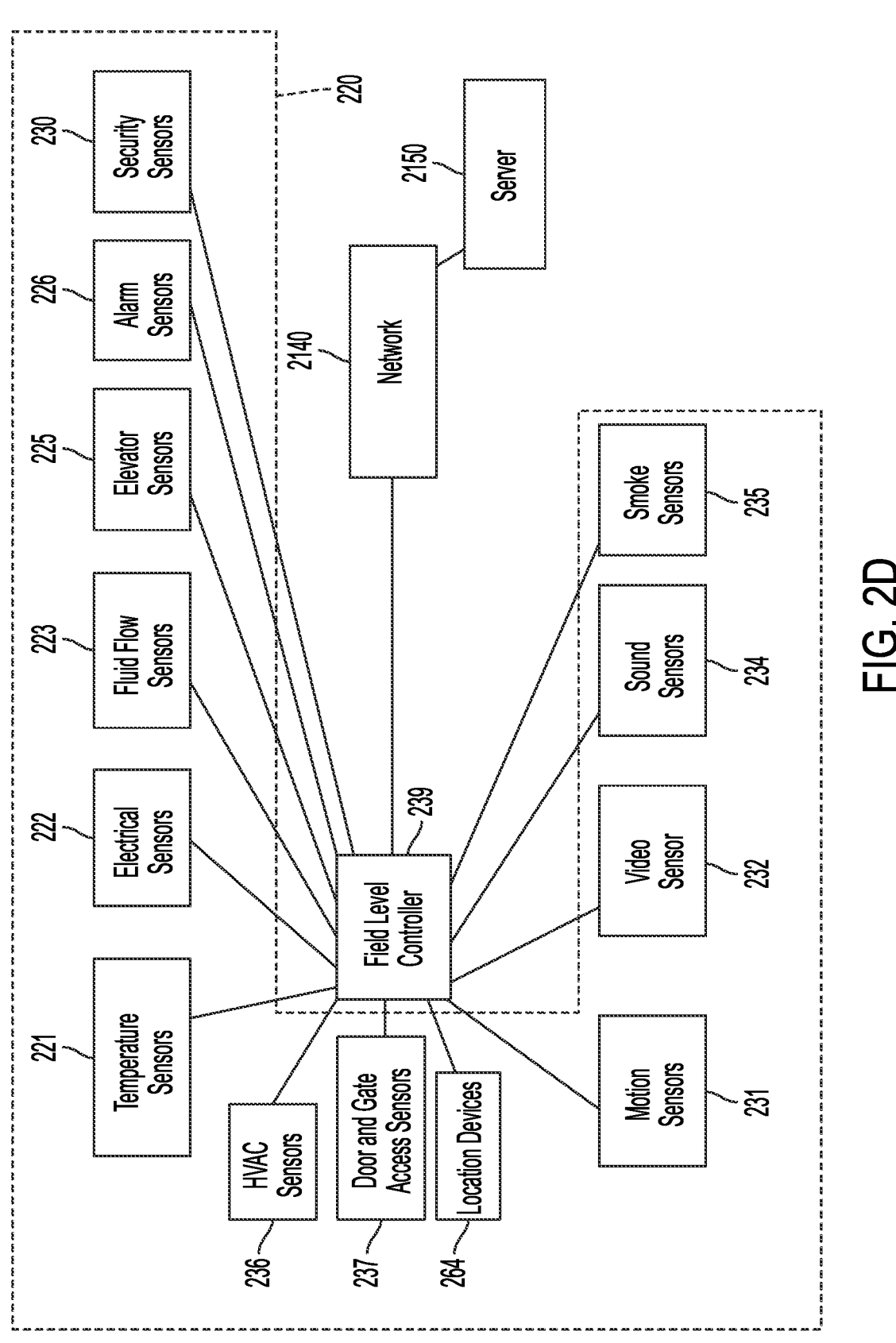
FIG. 2D illustrates a block diagram of exemplary building sensors connected to a network via field level controllers, according to one aspect of the present disclosure.
Figure 2E:
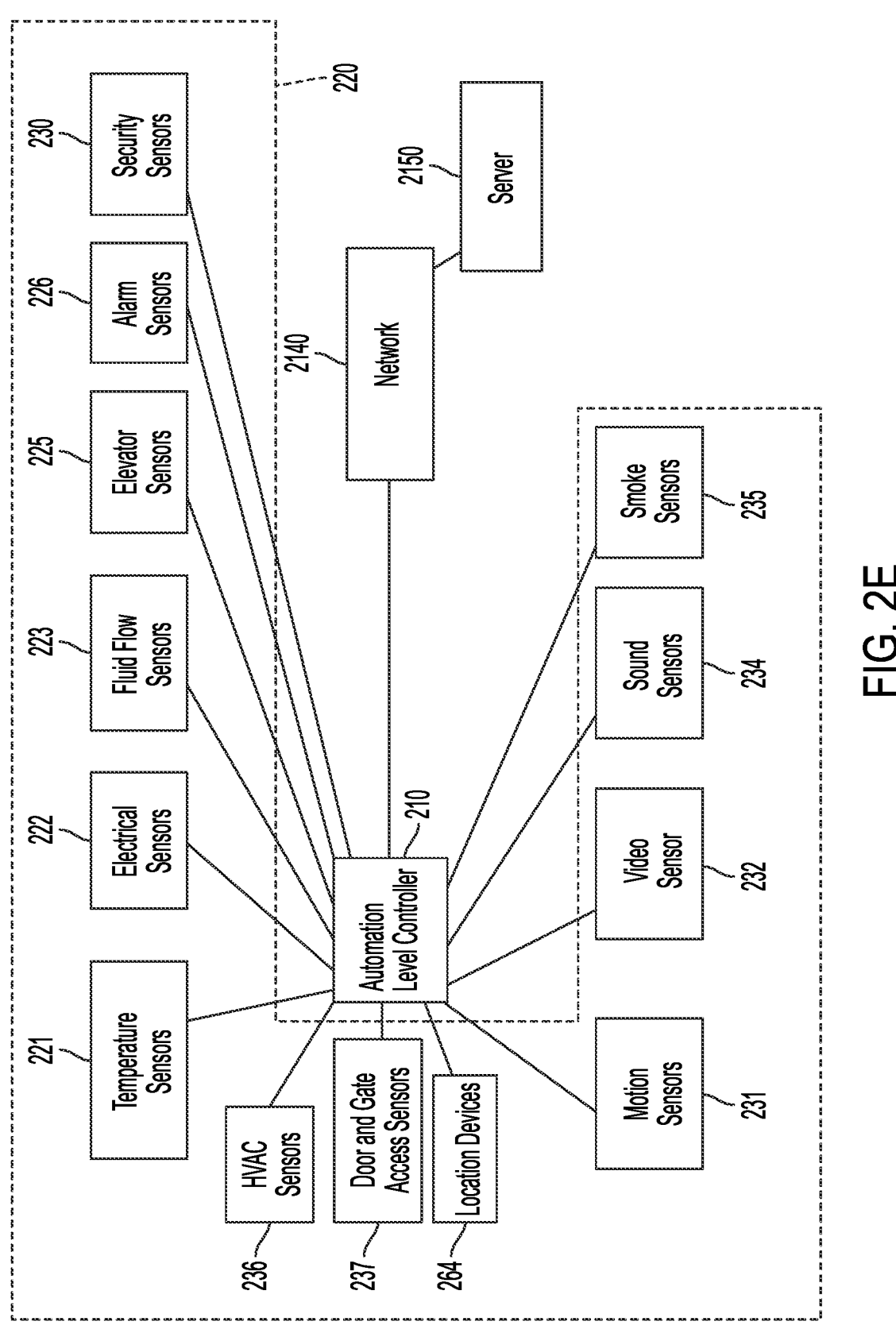
FIG. 2E illustrates a block diagram of exemplary building sensors connected to a network via automation level controllers, according to one aspect of the present disclosure.
Figure 2F:
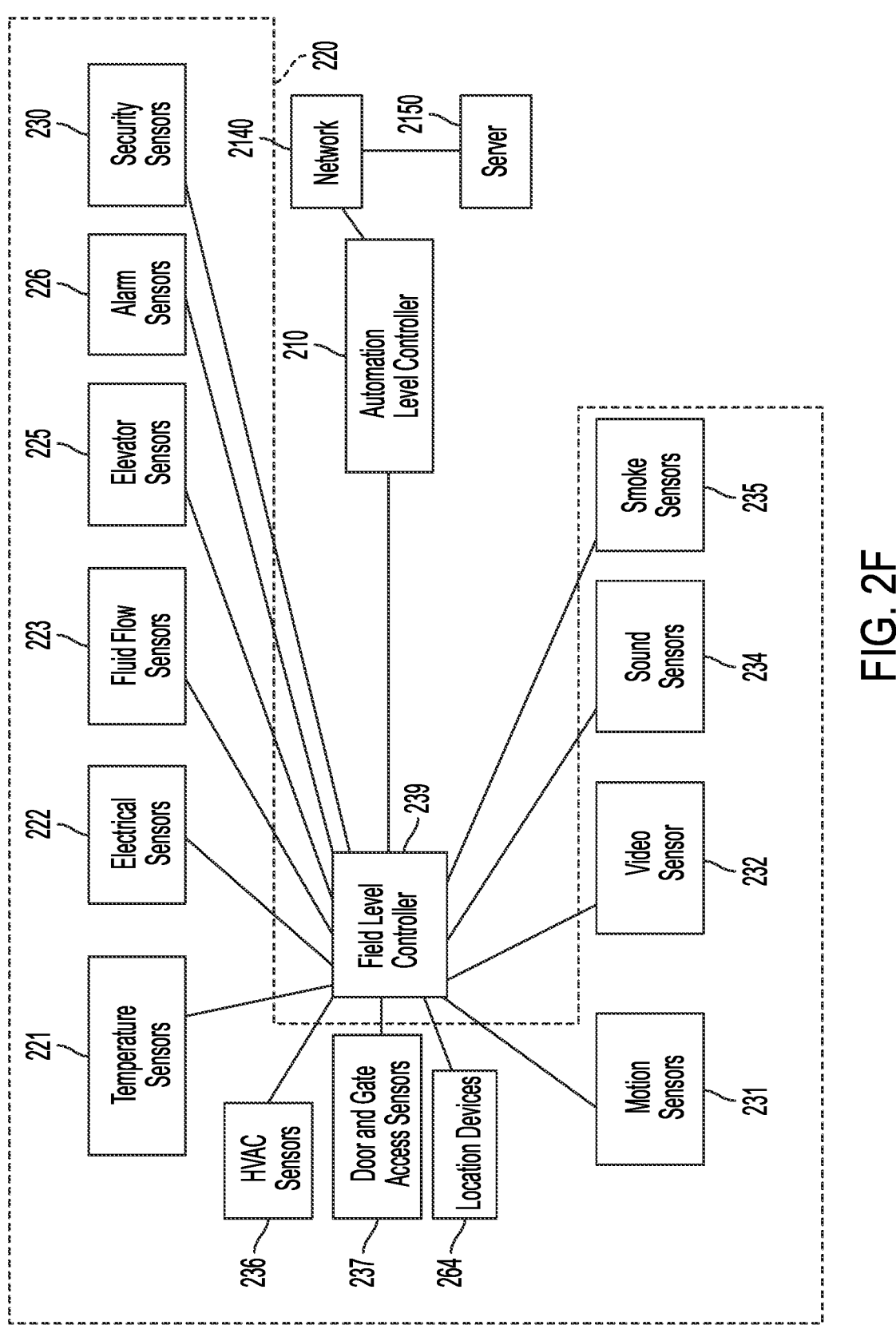
FIG. 2F illustrates a block diagram of exemplary building sensors connected to a network via field level controllers and automation level controllers, according to one aspect of the present disclosure.
Figure 2G:
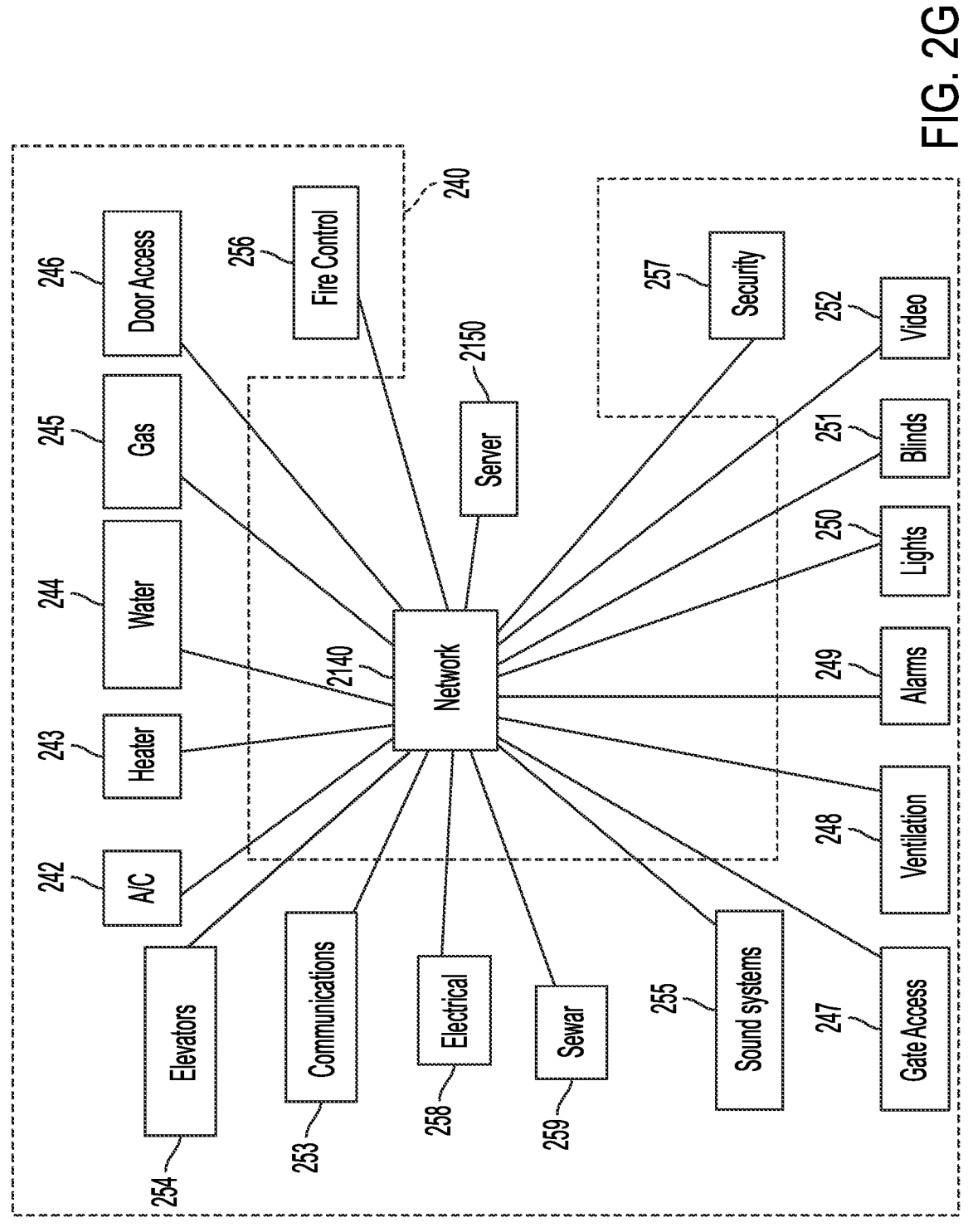
FIG. 2G illustrates a block diagram of exemplary building service equipment connected to a network.
Figure 2H:
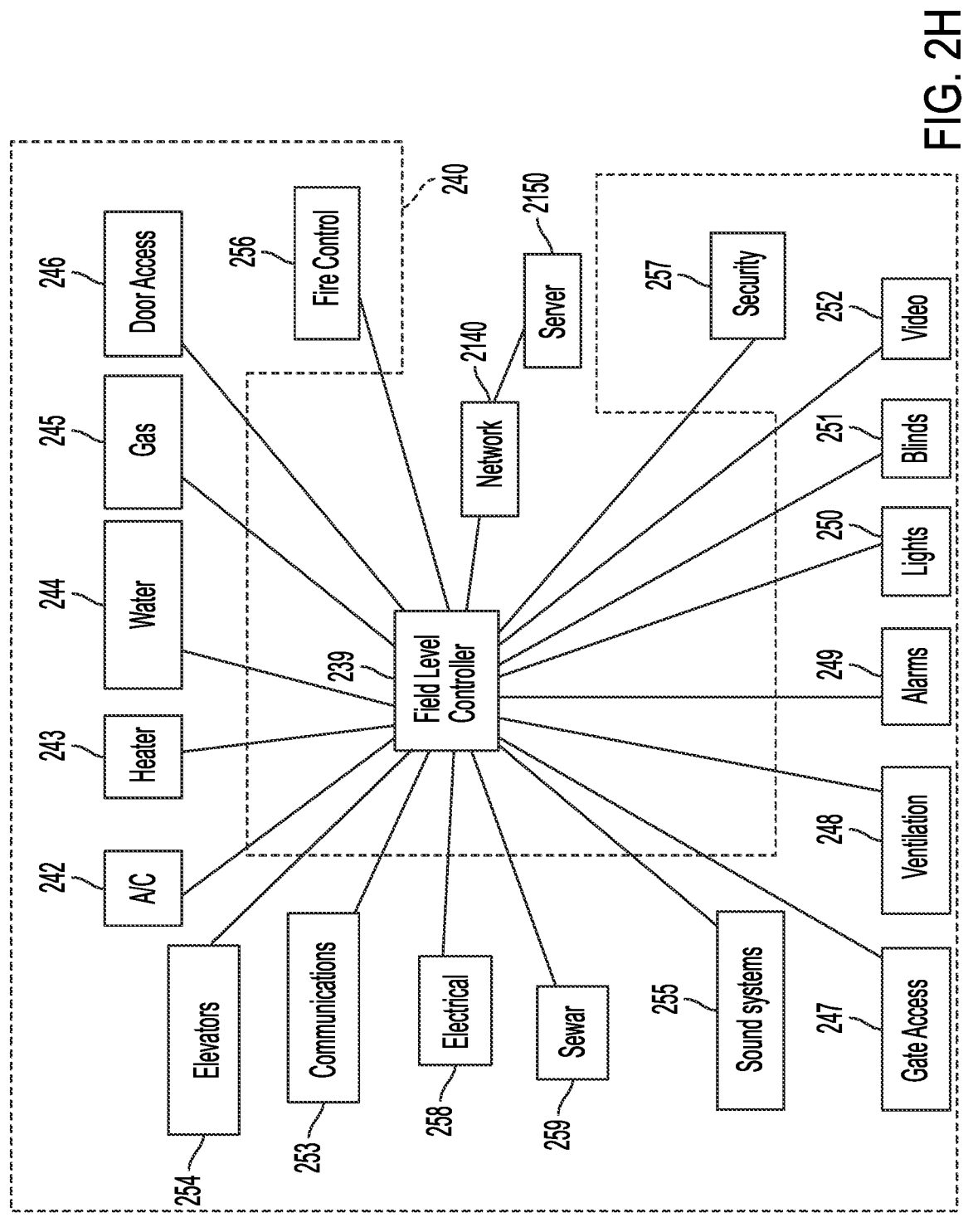
FIG. 2H illustrates a block diagram of building service equipment connected to a network via field level controllers, according to one aspect of the present disclosure.
Figure 2I:
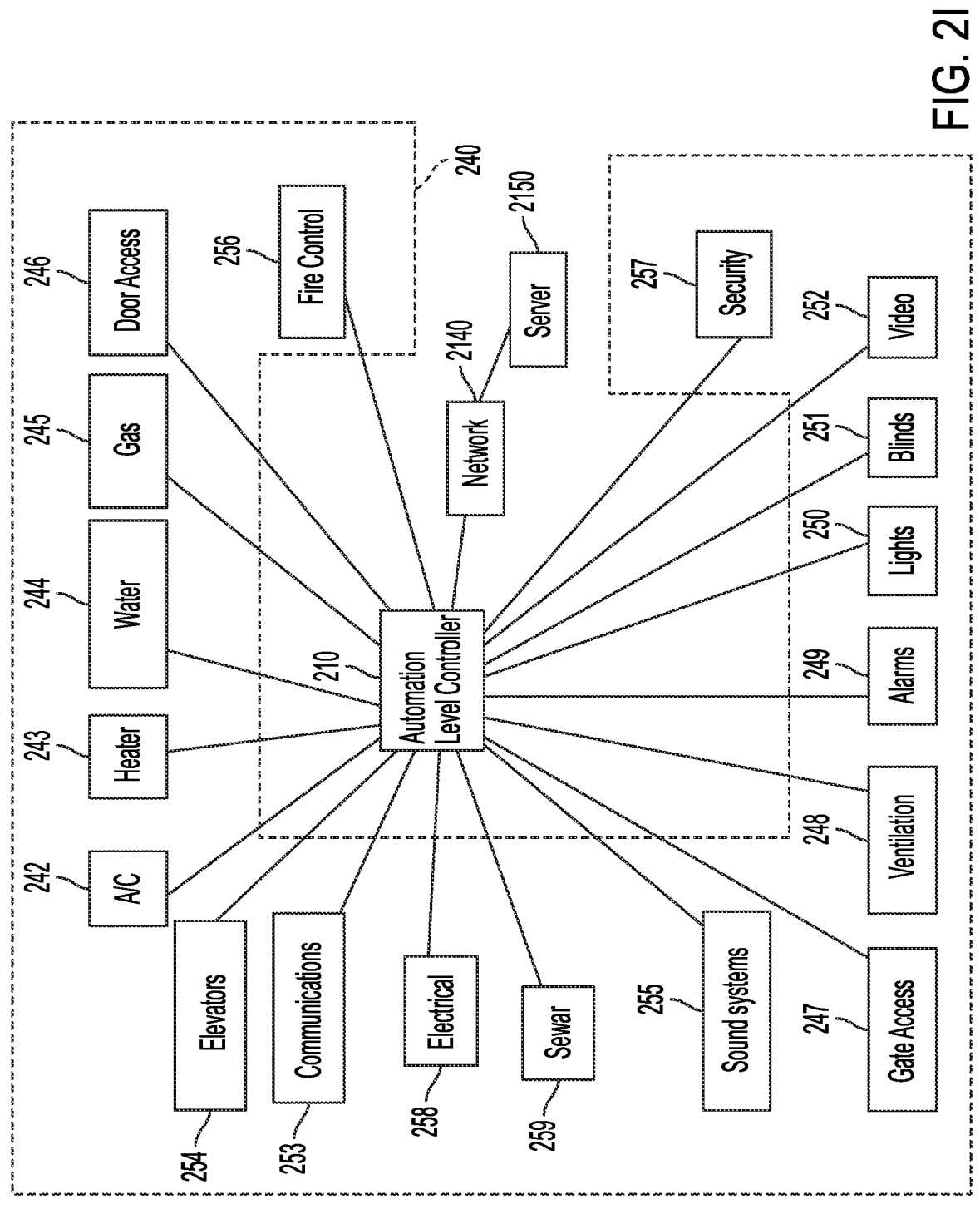
FIG. 2I illustrates a block diagram of exemplary building service equipment connected to a network via automation level controllers, according to one aspect of the present disclosure.
Figure 2J:
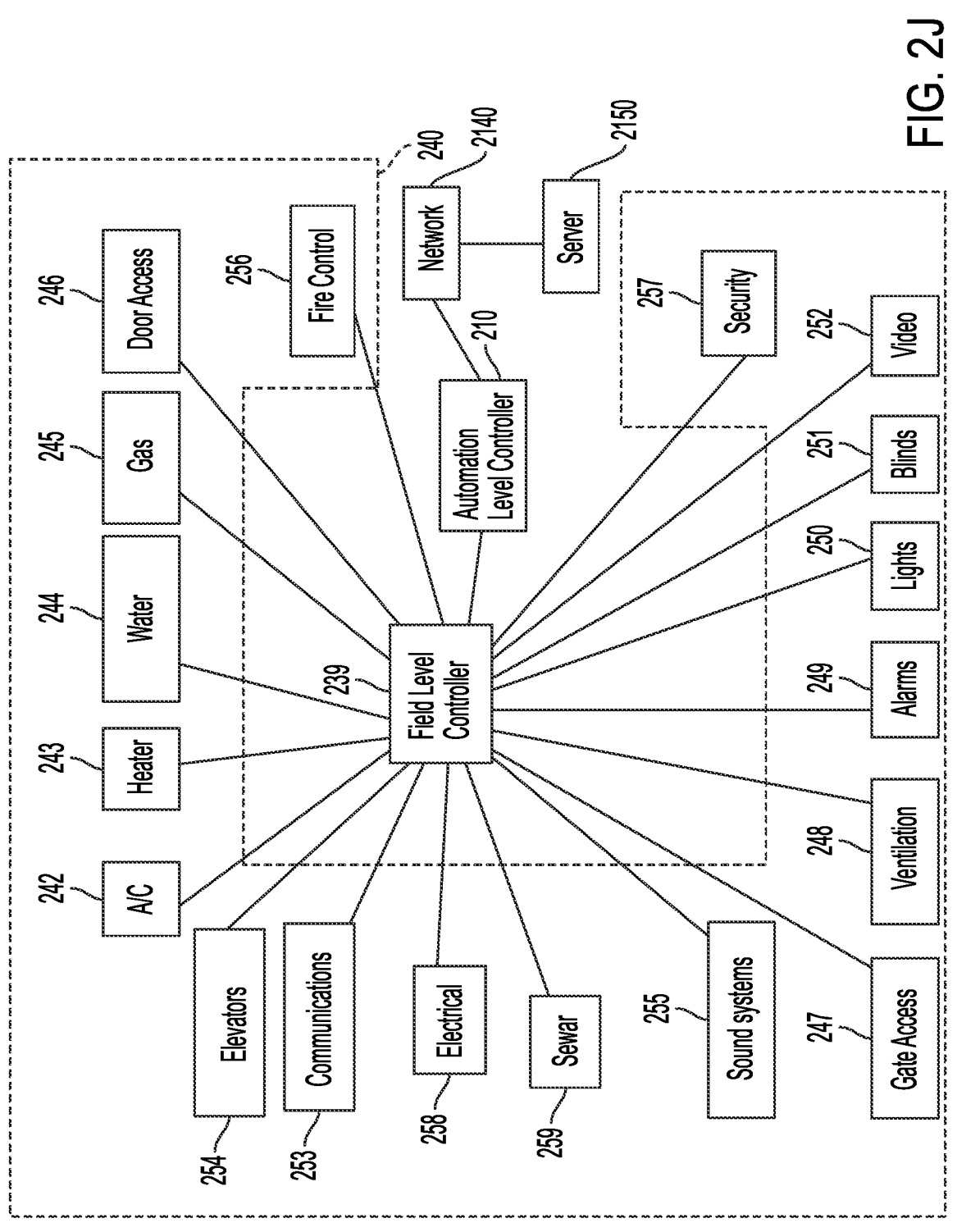

FIG. 2J illustrates a block diagram of exemplary building service equipment connected to a network via field level controllers and automation level controllers, according to one aspect of the present disclosure.

Figure 3A:
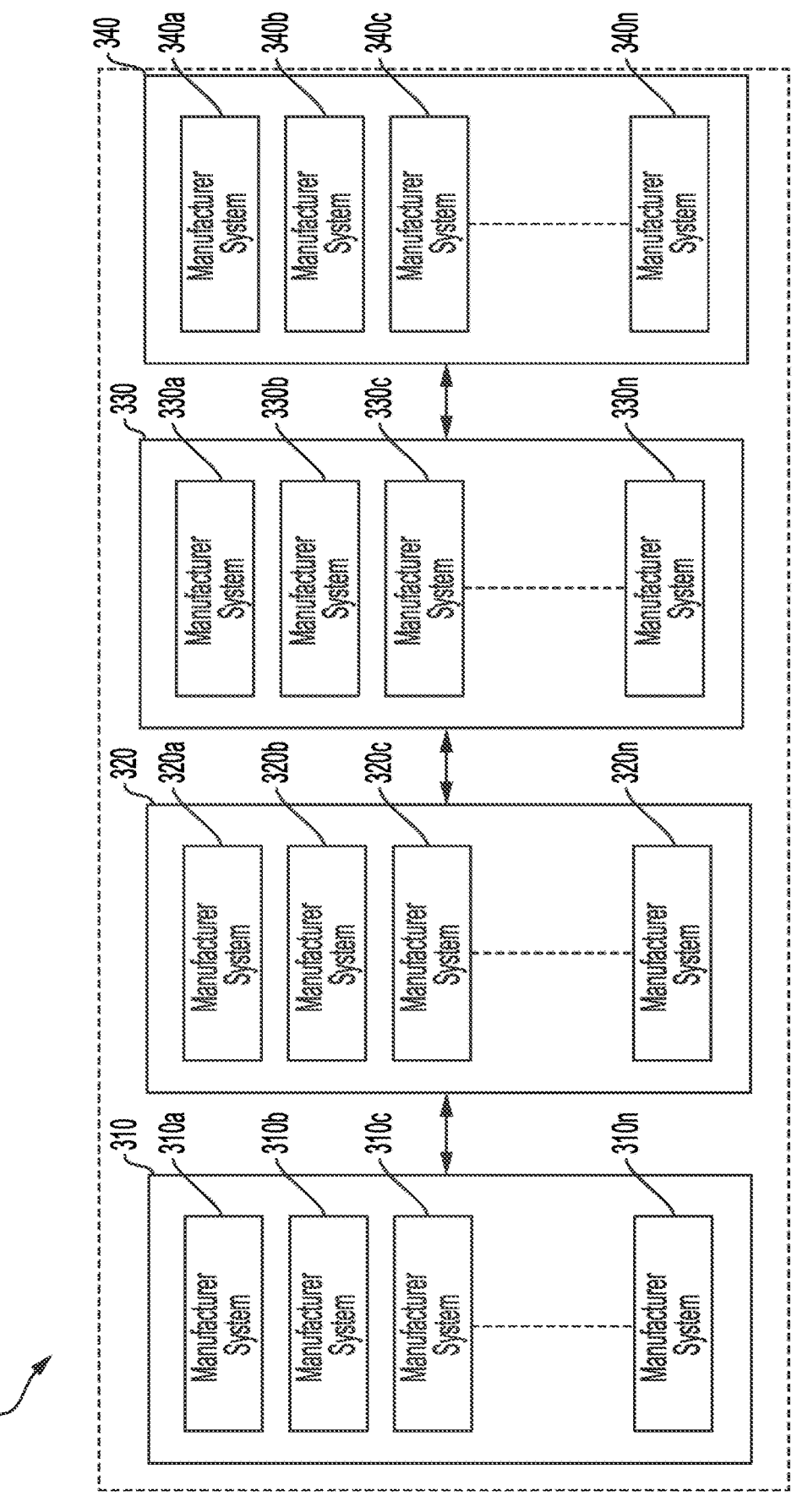

FIG. 3A illustrates examples of siloed building services equipment.

Figure 3B:
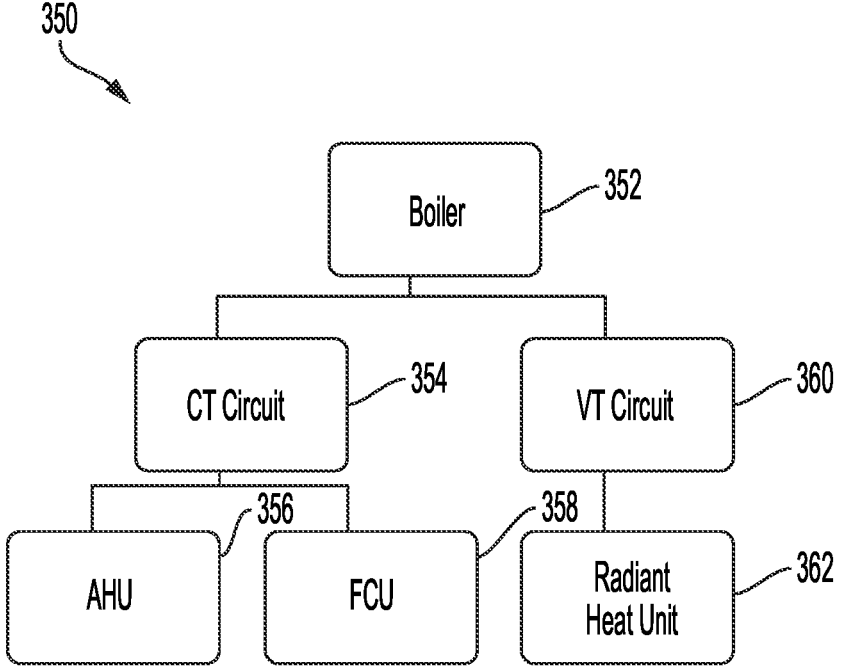
Figure 3C:
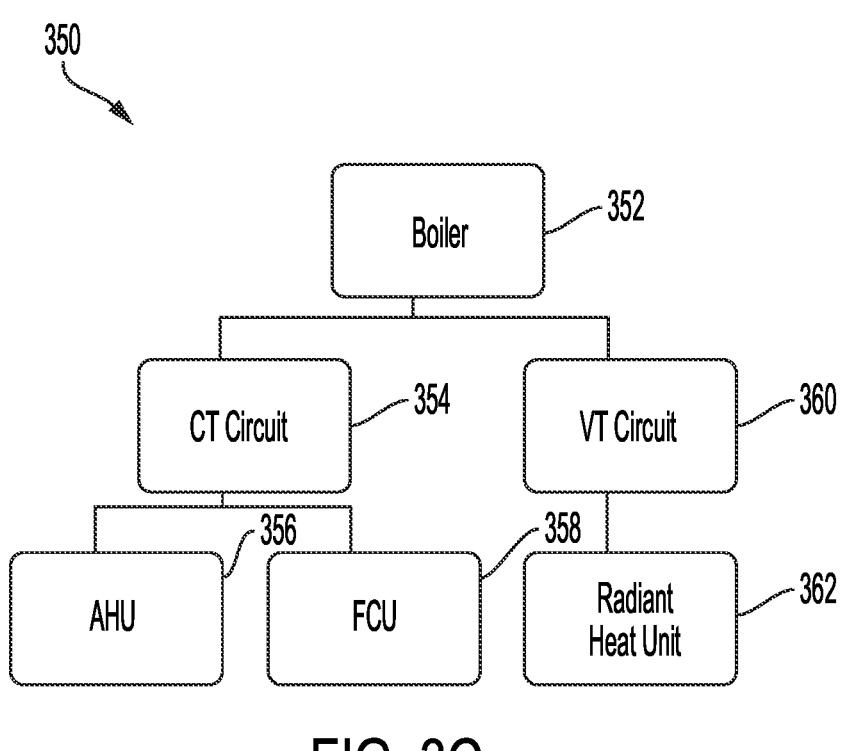

FIG. 3B illustrates an example of virtual assets representing the building HVAC of FIG. 3B, according to one aspect of the present disclosure.

Figure 4A:
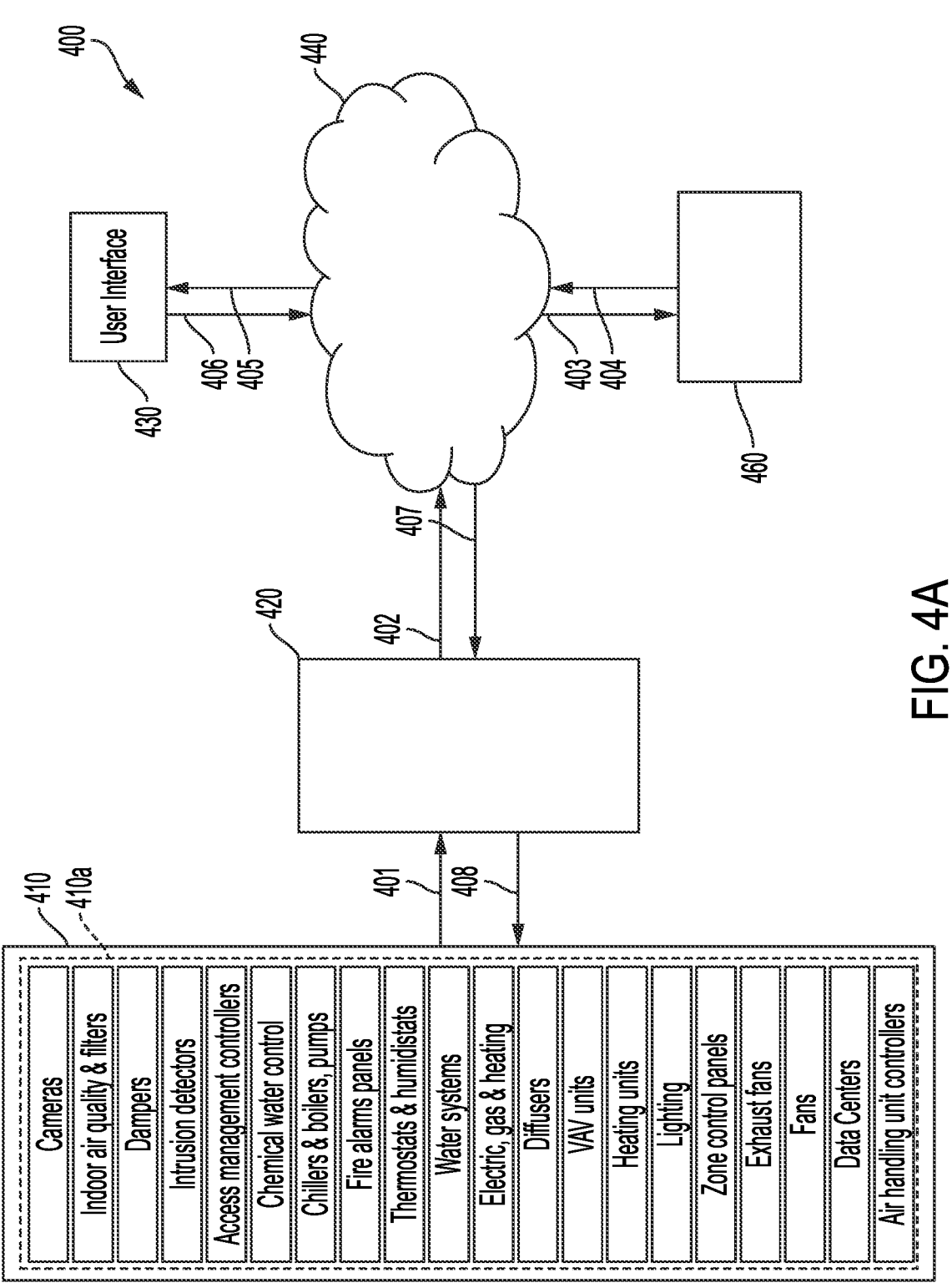

FIG. 4A illustrates an exemplary building digital operating system performing remote monitoring and controlling of multiple buildings with a cloud-based application system, according to one aspect of the present disclosure.

FIG. 4B illustrates an example of how normalization retags OEM labels to standard system labels, according to one aspect of the present disclosure.

Figure 4C:
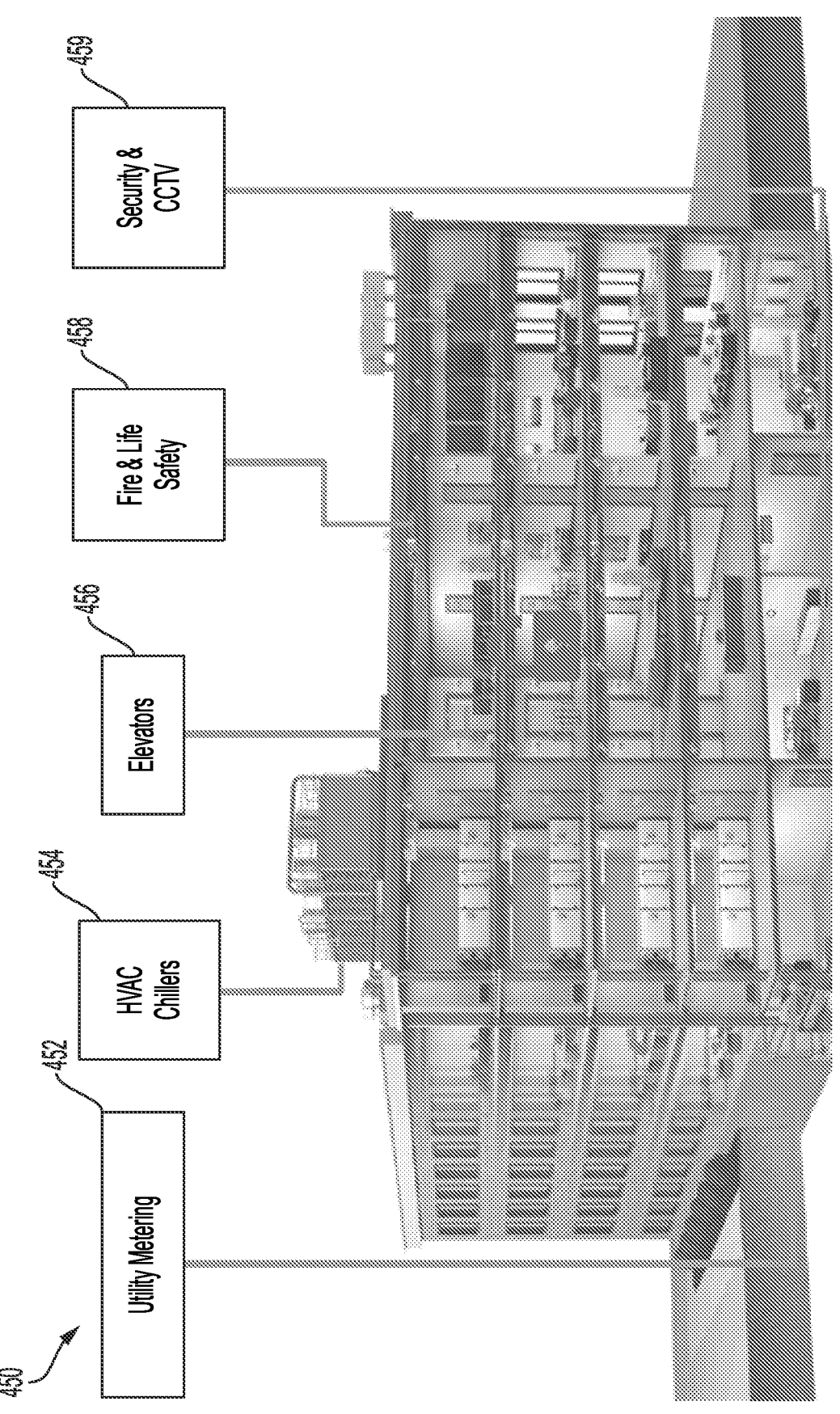

FIG. 4C illustrates a digital twin representation of a building with virtual assets, according to one aspect of the present disclosure.

Figure 4D:
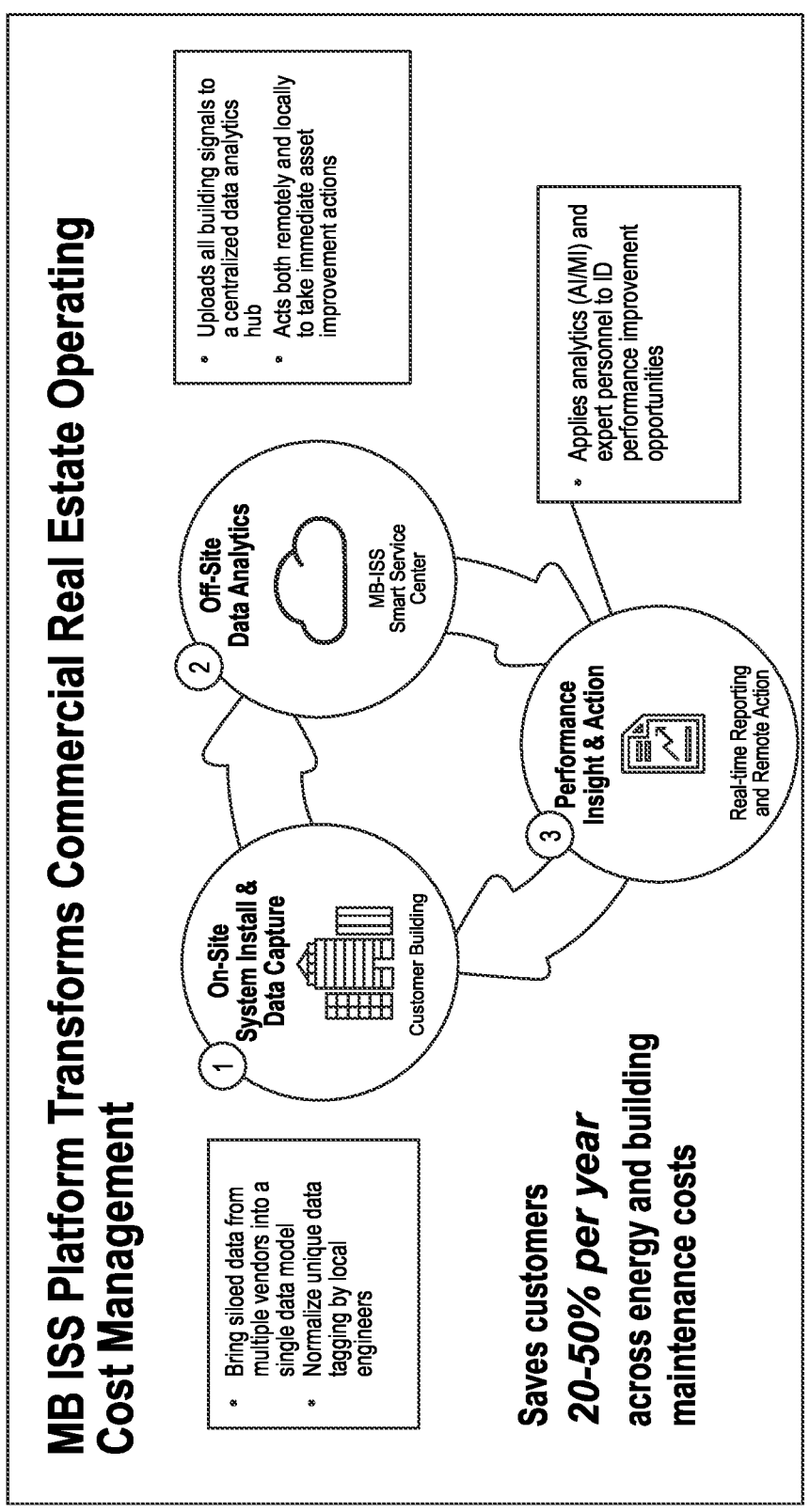

FIG. 4D illustrates an example of the installed system.

FIG. 4E illustrates an example of the installed system.

Figure 4F:

FIG. 4F illustrates an example of the installed system.

FIG. 4G illustrates an example of the installed system.

Figure 4H:
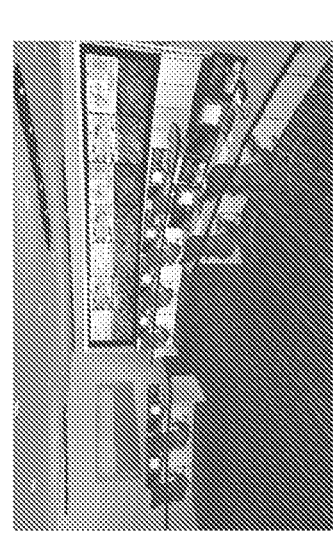
Figure 4H:
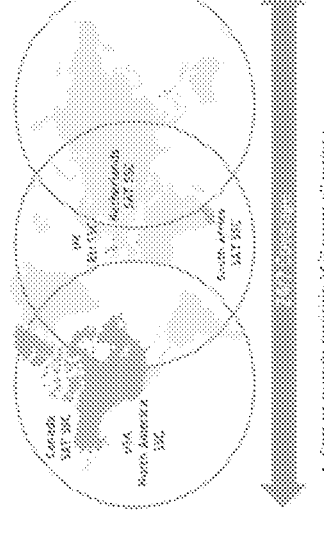

FIG. 4H illustrates an example of a service center.

Figure 4I:
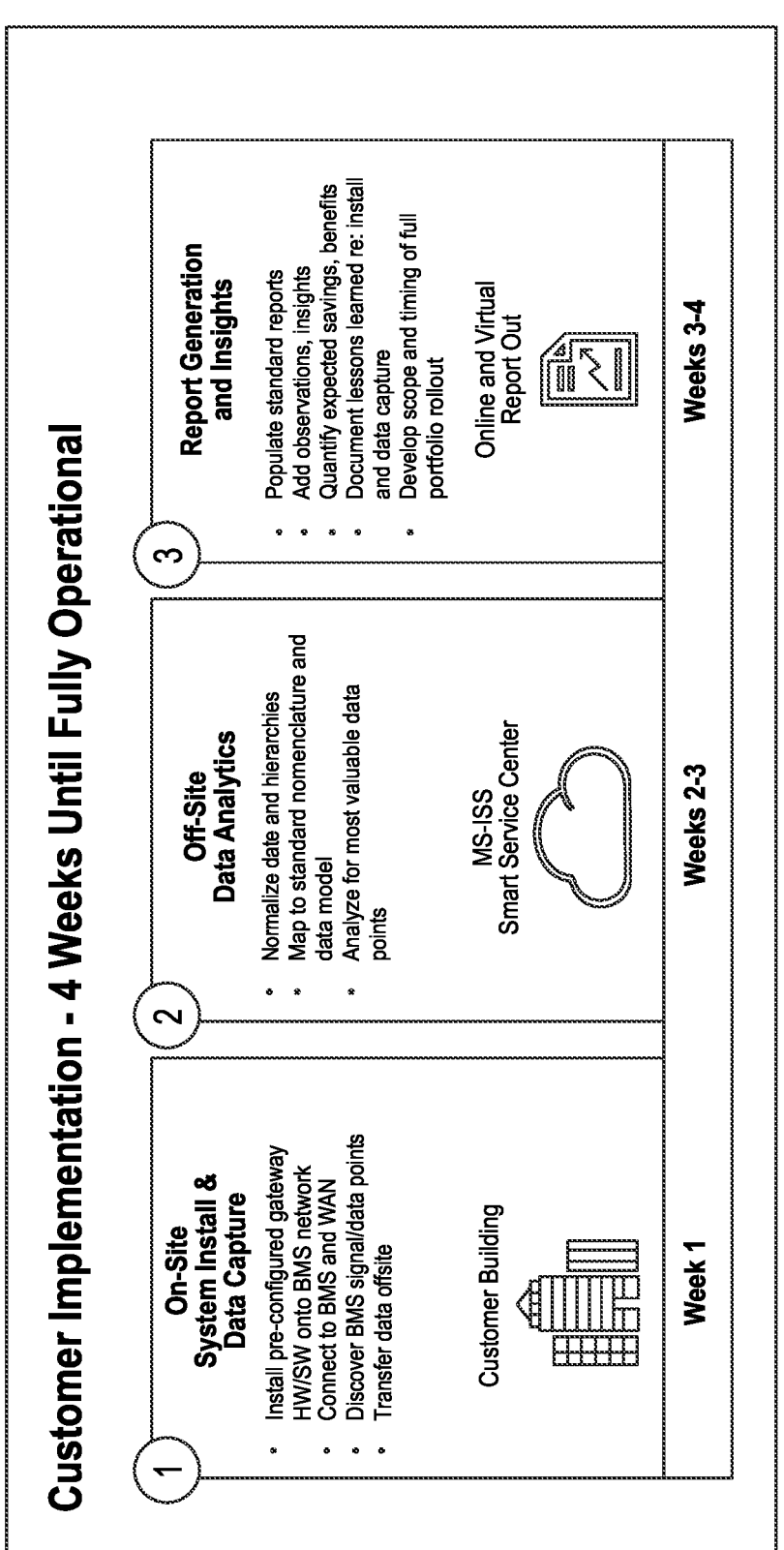

FIG. 4I illustrates an example of the timeline for installing the system.

FIG. 5 illustrates a flowchart of an exemplary method of executing a digital operating system, according to one aspect of the present disclosure FIG. 6A illustrates a flowchart of another exemplary method of executing a digital operating system, according to one aspect of the present disclosure.

Figure 1:
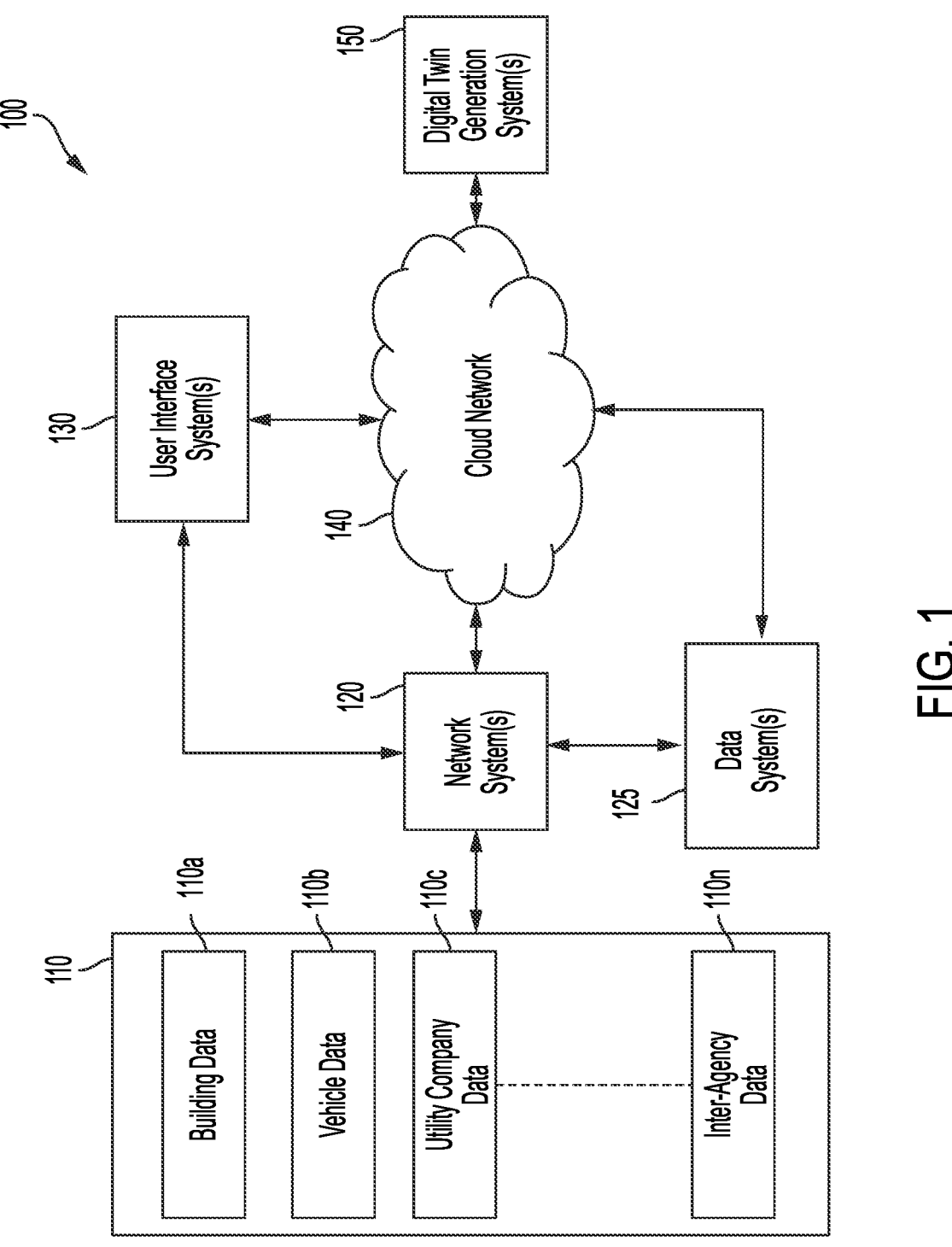
FIG. 1 illustrates a block diagram of an exemplary digital operating system, according to one aspect of the present disclosure.

FIG. 6A-1 is a continuation of the flowchart of FIG. 6A.

FIG. 6B is a continuation of the flow chart of FIG. 6A-1.

DETAILED DESCRIPTION OF THE
DISCLOSURE

In the following description, for purposes of explanation and not limitation, specific details are set forth, such as particular networks, communication systems, computers, terminals, devices, components, techniques, data and network protocols, software products and systems, operating systems, development interfaces, hardware, etc. in order to provide a thorough understanding of the present disclosure.

However, it will be apparent to one skilled in the art that the present disclosure can be practiced in other embodiments that depart from these specific details. Detailed descriptions of well-known networks, communication systems, computers, terminals, devices, components, techniques, data and network protocols, software products and systems, operating systems, development interfaces, and hardware are omitted so as not to obscure the description.

The method and system will now be explained with reference to the attached non-limiting drawings. The operations described in the figures and herein can be implemented as executable code stored on a computer or machine readable non-transitory tangible storage medium (e.g., floppy disk, hard disk, ROM, EEPROM, nonvolatile RAM, CD-ROM, etc.) that are completed based on execution of the code by a processor circuit implemented using one or more integrated circuits. The operations described herein also can be implemented as executable logic that is encoded in one or more non-transitory tangible media for execution (e.g., programmable logic arrays or devices, field programmable gate arrays, programmable array logic, application specific integrated circuits, etc.).

The following embodiments describe systems and methods for connecting, remotely monitoring, and controlling multiple systems across multiple entities with a single cloud-based application system, in an efficient manner to reduce energy consumption, increase equipment efficiency, reduce operational costs, reduce carbon emissions and simplify the overall control of the above-mentioned multiple systems. The multiple entities may include, for example, buildings, vehicles (e.g., motor vehicles, railed vehicles, spacecraft, etc.), manufacturing plants, and public service entities (e.g., utility companies, government agencies, etc.), but are not limited thereto.

As described above, there is a need for reducing energy consumption, increasing efficiency, reducing operating costs, reducing carbon footprints, and reducing labor costs associated with operating various systems in the above-described entities. According to one or more embodiments, the systems and methods of the present disclosure may provide advantages for remotely managing large numbers of buildings or vehicles, such as 100 or more, preferably 500 or more buildings from a single smart service center. Similarly, the systems and methods of the present disclosure may remotely manage large number of connected vehicles, manufacturing plants, and public service entities. That is, the systems and methods of the present disclosure is fully scalable to include any suitable entities to control, manage, and monitor. Consolidating the data flow and control of the entity assets to a smart service center provides numerous advantages. Industry experts no longer need to be experts in several different vendor systems and understand vendor language in each of the entity systems. Industry experts can now understand a standardized language and be on standby to efficiently and quickly handle problems as they arise in real time. Furthermore, the systems and methods of the present disclosure may convert the data flow and controls to simple to use virtual assets on a server to facilitate a quick understanding of any problems by the expert and provide a quick response time.

Referring now to the appended drawings, FIG. 1 illustrates an overview of an example digital operating system 100 according to one or more embodiments of the present disclosure. The digital operating system 100 may be a building digital operating system, a vehicle digital operating system, or any other entity digital operating system, in accordance with the present disclosure. The digital operating system 100 may include entity system(s) 110 and networks system(s) 120, which is connected to a cloud network(s) (or server(s)) 140. The digital operating system 100 may also include a data system(s) 125 and a user interface system(s) 130 which may be connected, directly or indirectly, to the network system(s) 120 and the cloud network(s) 140. The entity system(s) 110 may include data associated with various devices, sensors, equipment, etc. used in or associated with one or more entity system(s) 110. For example, the entity system(s) 110 may include entity system data 110a-n, for example, building data 110a, vehicle data 110b, utility company data 110c, and inter-government agency data 110n, but is not limited thereto. The entity system(s) 110 may be connected, directly or indirectly, to a network system(s) 120. In one embodiment, each of the entity system data 110a-n may include devices, sensors, equipment, etc. that are provided or installed by different manufacturers. As such, entity system data 110a-n may include proprietary information that requires different language, labels, protocols, specialists, etc. to interpret or understand the operating status (or) conditions of various devices, sensors, equipment, etc. in each of the entity system(s) 110. In one embodiment the entity system(s) 110 may be a single building, vehicle, public office (e.g., government agency), hospital, manufacturing plant, etc. that includes more than one proprietary device, sensor, equipment, etc. In this embodiment, the digital operating system 100 of the present disclosure may normalize the entity system data 110a-n in each of the entity system(s) 110 to manage and monitor each of the entity system(s) 110 with a single cloud-based platform, in accordance with the present disclosure. In another embodiment, the entity system(s) 110 may include multiple buildings, vehicles, public offices (e.g., government agency), hospitals, manufacturing plants, etc. that includes multiple proprietary devices, sensors, equipment, etc. In this embodiment, the digital operating system 100 may normalize the entity system data 110a-n in multiple entity system(s) 110 to manage and monitor multiple entity system(s) 110 with a single cloud-based platform, in accordance with the present disclosure. For example, a user or operator of the digital operating system 100 many monitor the status and condition of multiple buildings with multiple different proprietary devices or systems installed in each of the multiple buildings from a single cloud-based platform. The user or operator in the digital operation system 100 does not need to understand the different proprietary rules, labels, protocols, language, etc. of the systems installed in multiple different buildings since the digital operation system 100 of the present disclosure. That is, the digital operation system 100 will convert (or re-tag) and normalize the data associated with the different propriety systems and devices into a single universal language, which can be utilized to create a digital representation(s) of buildings, vehicles, vehicles, public offices (e.g., government agency), hospitals, manufacturing plants, etc. The user or operator may access and control the entity system(s) by using the user interface system(s) 130.

In one embodiment, the network system(s) 120 may be implemented in accordance with embodiments of the present disclosure, including a wired or wireless local area network (LAN) and a wide area network (WAN), wireless personal area network (PAN) and other types of networks. The network system(s) 120 may include connections over the Internet, an Intranet, Extranet, Ethernet, telephone network, or any other system that provides communications. When used in a LAN networking environment, computers may be connected to the LAN through a network interface or adapter. When used in a WAN networking environment, computers typically include a modem or other communication mechanism. Modems may be internal or external and may be connected to the system bus via the user-input interface, or other appropriate mechanism. Computers can be connected over the Internet, an Intranet, Extranet, Ethernet, telephone network, or any other system that provides communications. Some suitable communications protocols may include TCP/IP, UDP, OSI, Ethernet, WAP, IEEE 802.11, Bluetooth, Zigbee, IrDa or any other desired protocol. Furthermore, components of the system may communicate through a combination of wired or wireless paths. In one embodiment, the network system(s) 120 may include a network controller and/or a gateway. The gateway may include pre-installed software and may be located on a LAN.

In one embodiment, the data system(s) 125 may receive entity system data 110a-n via the network system(s) 120 and/or via the cloud network(s) (or server(s)) 140. The data system(s) 125 may include one or more servers or databases to store the entity system data 110a-n. In one embodiment, an edge gateway connected to the network system(s) 120 (e.g., local data network) may facilitate communication with local system protocols and the gateway to transfer entity system data 110a-n to the data system(s) 125. The entity system data 110a-n may be stored on the data system(s) 120. The data system(s) 125 may then carry out Edge Based Asset and device Data-point Discovery to facilitate a tagging process of the entity system data 110a-n, in accordance with the present disclosure. For example, the data system(s) 125 may employ a tagging strategy with 5 primary levels of tags. In one embodiment, information (names) within a tag may be combined into a single string and as such kept in the data system(s) 125. The primary 5 tags may be described, for example, as: building identifier, floor identifier, sub-location identifiers, system type, asset type identifiers. Of course, the identifiers may vary for vehicles, manufacturing plants, hospitals, etc. in any suitable manner in accordance with the present disclosure. Additionally or alternatively, the tags may include information on data point names, data point types and data measurement units of the entity system data 110a-n. The entity system data 110a-n that have been tagged by the data system(s) 125 may be transmitted to the cloud network(s) 140 to perform structurization, normalization and/or generation of a digital twin(s) of the entity system(s) 110 based on the tagged entity system data 110a-n.

Still referring to FIG. 1, the cloud network(s) 140 may be connected to or may include a digital twin (or representation) generation system(s) 150. In one embodiment, the cloud network(s) 140 may include one or more servers storing data or instructions for facilitating normalization of the tagged entity system data 110a-n and generation of digital representation(s) of the entity system(s) 110 of the present disclosure. In one embodiment, the digital twin generation system(s) 150 may be part of the cloud network(s) 140 or may be on a separate server from the cloud network(s) 140. In one embodiment, the digital twin generation system(s) 150 may be on another cloud network. In one embodiment, the digital twin generation system(s) 150 may be an algorithm(s) or program(s) in the cloud network(s) 140 for generating digital representation(s) of entity system(s) 110 in accordance with the entity system data 110a-n.

Still referring to FIG. 1, the digital operating system 100 may utilize the cloud network(s) 140 and/or the digital twin generation system(s) 150 to generate a digital twin(s) or representation(s) of the entity system(s) 110 to facilitate monitoring, management, and/or control of the entity system data 110a-n and the associated assets (e.g., devices, sensors, alarms, equipment, etc.) of the entity system(s) 110. As described in the foregoing embodiments, the cloud network(s) 140 and/or the digital twin generation system(s) 150 may receive tagged entity system data 110a-n from the data system(s) 125. The cloud network(s) 140 and/or digital twin generation system(s) 150 may structure each tag in the entity system data to have a number of additional fields to store granular entity system data (e.g., Original Equipment Manufacturer (OEM) data including Manufacturer, Type, Serial number, etc.). These tags may be structured systematically to allow any number of user interface system(s) 130 to access the cloud network(s) 140 (e.g., central database) to analyze performance metrics of the entity system(s) 110. The cloud network(s) 140 may utilize a universal syntax/semantic language to normalize or re-tag each selected data point in the entity system data 110a-n. In one embodiment, the cloud network(s) 140 may interface with the data system(s) 125 access the entity system data 110a-n that tagged or containerized and execute automated normalization of the tagged entity system data 110a-n. The cloud network(s) 140 may utilize code, algorithm, or software to understand the tagged entity system data 110a-n and may store the relevance between data point(s) of an entity device, sensor, alarm, equipment, etc. and the connected source (i.e., actual device, sensor, alarm, equipment, etc. on the site). For example, the relevance may be related to a light or equipment in any number of sub network activities based on existing control networks within a building.

In one embodiment, the cloud network(s) 140 may include a centralized repository or database(s) (or server) that allows all types of structured and unstructured data to be stored at any scale. The data may be deposited in any structure without having to first structure the data. Databases in the cloud network(s) 140 may be installed to run different types of big data processing, real-time analytics, and machine learning. The cloud network(s) 140 may include instructions, program, or software that may automate cloud migrations, speeds up data preparation, makes data governance easy, simplify data management, and accelerate data delivery for the different service offerings within the digital operation system 100. For example, the software in the cloud network(s) 140 may be configured to select the most effective subset of all the identified device data points within the entity system data 110a-n, which are available to facilitate creation of the digital twin(s) of the entity system(s) 110. In one embodiment, machine learning/artificial intelligence technology tool having a multi factor rule-based screening model may be utilized to identify the fewest or smallest number of device (e.g., sensor, alarm, equipment, etc.) data points which allows the greatest control over the entity system(s) 110. The rules (factors) and weightings (these vary over time with AI/Machine learning) and other control interfaces (the owner, engineer, other user inputs) may be determined using an AI/machine learning model that is adjusted based on customer preferences and available entity system(s) knowledge and intelligence.

In one embodiment, the digital twin generation system(s) 150 may utilize the normalized data from the cloud network(s) 140 to generate a digital twin(s) of the entity system(s) 110, which may be a working visual copy of the entity system(s) 110. As such, the digital twin may allow users or operators to understand the status and condition of the entity system(s) 110, write reports, develop new protocols, optimize performance, risk and budget manage and to provide specific and anonymized data to users or customers as analytic tools. The digital twin(s) may enable deployable services and supporting of remote management capability by being accessible via the user interface system(s) 130. The digital twin generation system(s) 150 may be configured to facilitate modular management and self-recovery of the operation of the digital twins in the event of failure and may support local buffering of data in the event of communication loss so that it can be re-synchronized on re-connection. The digital twin generation system(s) 150 may also provide a unified internal messaging service to support modules of mixed programming languages to best leverage the key strengths in each application. Once the generation and configuration of the digital twin(s) is complete, the digital twin(s) may be accessed via a cloud based software application (e.g., user interface), which may be used internally and externally to visualize the entity system data 110a-n in user friendly dashboards and reports. Thereafter, further digital twins of the buildings (or any other entity system(s)), assets or devices can be created. As such, analysis of device or entity system(s) data can be compared across multiple buildings, assets and devices. Further, outputs/results, monitoring, control, and reporting can all be visualized from the cloud based software application (e.g., user interface).

Still referring to FIG. 1, the user interface system(s) 130 may include a keyboard or a touch screen display configured to input and output information. The user interface system(s) 130 may contain a web browser or similar program, allowing in some embodiments for a secure SSL connection, and able to display HTML and CSS. This includes user interface system(s) 130 such as tablets, iPads, Mac OS computers, Windows computers, e-readers, workstations, and mobile user devices such as the iPhone, Android, and Windows Phone. The user interface system(s) 130 can connect to the cloud network(s) 140 and/or the digital twin generation system(s) 150 via the internet and/or wirelessly, such as through a mobile telephone network, and/or any other suitable medium. The user interface system(s) 130 may be able to communicate with the cloud network(s) 140 so that operation or control can be started on one user interface system(s) 130 and later continued on a different user interface system(s) 130.

In one embodiment, the user interface system(s) 130 may be configured to control and/or interact with the entity system(s) 110 at a user or operator level. Additionally, the user interface system(s) 130 may provide analytics on the entity system data 110a-n generated from the entity system(s) 110. The user interface system(s) 130 may be configured to provide pre-defined rules and workflows to the entity system(s) 110, the cloud network(s) 140, and/or digital twin generation system(s) 150 based on live data and trigger points. Additionally, the user interface system(s) 130 may configured to dynamically access the entity system data 110a-n provided as insightful graphical data generated by the cloud network(s) 140 and the twin generation system(s) 130. In one embodiment, the user interface system(s) 130 may be configured to monitor, notify and manage various alarms and other system devices and equipment. Additionally, the user interface system(s) 130 may be utilized for task scheduling for both maintenance tasks and occupancy in buildings or offices. Also, the user interface system(s) 130 may provide visualization of live data for assets in the entity system(s) 110 while replicating any existing data hierarchy. In one embodiment, the digital operating system 100 can be accessed via any user interface system(s) 130 that is capable of connecting to the network system(s) 120 and/or the cloud network(s) 140. The user interface system(s) 130 may include a keyboard or touch screen display to input information.

In one embodiment, the user interface system(s) 130 may include a web browser or similar program, allowing in some embodiments for a secure SSL connection, and able to display HTML and CSS. This includes user interface system(s) 120 such as tablets, iPads, Mac OS computers, Windows computers, e-readers, workstations, and mobile user devices such as the iPhone, Android, and Windows Phone. The user interface system(s) 130 can connect to the server via the internet and/or wirelessly, such as through a mobile telephone network, and/or any other suitable medium.

The cloud network(s) (or server(s)) 140 described herein can include one or more computer systems directly or indirectly connected to one another and/or connected over a network. Each computer system can include a processor, tangible, non-volatile memory, user input and user output mechanisms, a network interface, and executable program code (software) comprising computer executable instructions stored in non-transitory tangible memory that executes to control the operation of the cloud network(s) (or server(s)) 140. Similarly, the processor's functional components may be formed of one or more modules of program code executing on one or more computers. Various commercially available computer systems and operating system software can be used to implement the hardware and software. The components of each server can be co-located or distributed. In addition, all or portions of the same software and/or hardware can be used to implement two or more of the functional servers (or processors) shown. The cloud network (or server(s)) 140 can run any desired operating system, such as Windows, Mac OS X, Solaris or any other server based operating systems. Other embodiments can include different functional components. In addition, the present disclosure is not limited to a particular environment or cloud network(s) (or server(s)) 140 configuration. The cloud network(s) (or server(s)) 140 can be a cloud-based computer system.

Examples of non-volatile memory include flash memory, read-only memory (ROM), ferroelectric RAM, most types of magnetic computer storage devices (e.g. hard disk drives, floppy disks, and magnetic tape), optical discs, and early computer storage methods such as paper tape and punched cards.

In one embodiment, the cloud network(s) (or server(s)) 140 may include a web server and a query processing unit. The web server may receive the user requests and send it to the query processing unit. The query processing unit may process the request and respond back to the user interface system(s) 130 via the web server. The query processing unit may fetch data from the database server if additional information is needed for processing the request.

The cloud network(s) (or server(s)) 140 can include a plurality of individual computer systems directly connected and/or connected over a network. Software program modules and data can be stored in the non-volatile memory of the cloud network (or server(s)) 140 may be arranged in logical collections of related information on a plurality of computer systems having associated non-volatile memories. The cloud network(s) (or server(s)) 140 can comprise the non-volatile memory or the cloud network(s) (or server(s)) 140 can be in communication with the non-volatile memory storing the database. The software (computer program code) required to operate the digital operating system 100 and data can be stored in the non-volatile memory using any data structures known in the art including files, arrays, linked lists, relational database tables and the like.

FIG. 1 is provided as an example. Other examples are possible and may differ from what was described with regard to FIG. 1. The number and arrangement of devices and networks shown in FIG. 1 are provided as an example. In practice, there may be additional devices, fewer devices and/or networks, different devices and/or networks, or differently arranged devices and/or networks than those shown in FIG. 1. Additionally, or alternatively, a set of devices (e.g., one or more devices) of the digital operating system 100 may perform one or more functions described as being performed by another set of devices of the digital operating system 100.

One exemplary embodiment relating to building management incorporating the digital operating system(s) of the present disclosure will be described hereinafter. The systems and methods of the present disclosure may allow large commercial real estate portfolio managers to scale performance improvements across their entire building portfolio. This embodiment of the systems and methods of the present disclosure provide novel remote building management data analytics in the digital real estate management space. Accordingly, the systems and methods of the present disclosure enable property owners, managers, and tenants to create an "information advantage" with an integrated data aggregation, analytics, and agile action operating system.

As described above, the present disclosure is not limited to the building management described in the foregoing section. That is, the digital operation system(s) described in relation to the building management may be implemented with, for example, but not limited to, vehicle-to-vehicle management, manufacturing data management, public service entity management, or any other suitable entity system management discussed in the foregoing embodiments.

Referring now to FIG. 2A, this figure illustrates an exemplary building digital operating system 200, according to one aspect of the present disclosure. In one embodiment, the building digital operating system 200 may include a network system 2140. The network system(s) 2140 may be implemented similarly to the network system(s) 120 described above in reference to FIG. 1.

The digital building operating system 200 may include one or more user interface device(s) 2120 that may be capable of connecting to a main server 2150 connected to the network system 2140. The main server 2150 may be implemented similarly to the cloud network(s) (or server(s)) 140 and/or the digital twin generation system(s) 150 described above in reference to FIG. 1. Further, the user interface device(s) 2120 may be implemented similarly to the user interface system(s) 130 described above in reference to FIG. 1. In one embodiment, the user interface device(s) may include a display 2122.

In one embodiment, the software (computer program code) required to operate the system 200 and any relevant data used for the system 200 may be stored in a non-volatile memory using any data structures known in the art including files, arrays, linked lists, relational database tables and the like. The stored data may include, for example, client information, and building information. The building information may include data from building sensors 220, which may be part of a field devices level 214, and building services equipment 240, which may be part of automation level 216. The software stored in the main server 2150, which may be part of a management level 218, may include algorithms or logic utilized to normalize the data, generate a digital twin, and maintain and control the building services equipment 240, in accordance with the present disclosure. The software stored can also include the programming for providing the digital copy of a building and virtual assets (later described in more detail in FIG. 4B).

Referring to both FIGS. 2A and 2B, the building digital operating system 200 may include three levels of integration: a field devices level 214; an automation level 216; and a management level 218. Although, the integration levels are described hereinafter in relation to buildings. the present disclosure is not limited to implementing the systems and methods for building management. Additionally, or alternatively, the embodiments described hereinafter may be applied or implemented similarly to, for example, vehicle-to-vehicle data management, manufacturing data management, government services management, public utility management, or any other suitable entity system management. That is, where a building is referenced in accordance with one or more embodiments, a vehicle, a utility company, a government agency, a manufacturing facility, or any other suitable entity may be interchangeably referenced to yield systems and methods for connecting, remotely monitoring, managing and controlling service systems across multiple buildings, systems, vehicles, agencies, utilities, etc. in a single cloud-based platform, in an efficient manner to reduce energy consumption, increase equipment efficiency, reduce operational costs, reduce carbon emissions and simplify the overall control of multiple buildings, systems, vehicles, agencies, utilities, etc.

FIG. 2B illustrates a detailed scheme for the three level integration for the building digital operation system 200. The field devices level 214 may include integrated building sensors 220 and building services equipment 240. In some embodiments, the field devices level 214 may also include field level controllers 239 connected to the building sensors 220 and building services equipment 240. The building services equipment 240 may include, for example, room controls, plant controls, VAV controller, etc. In one embodiment, the building services equipment 240 may be coupled to a chiller 260, actuators and valves 261, fan coils 262, VAV box 263, etc. The automation level 216 may be where the building data flowing from the building sensors 220 and building services equipment 240, directly or indirectly through the field level controllers 239, may be collected by automation level controllers 241 and then routed to the network system(s) 2140. Additionally or alternatively, the building data may be routed directly to the network system(s) 2140. In one embodiment, the automation level 216 may also include a third party integrator 280, to which a third party system(s) 290 is connected. In one embodiment, the automation level 216 may also include an operator terminal 270 that may be connected, for example, to a building services equipment 240 and the field level controller 239. The management level 218, which may include and integrate the server 2150, user interface devices 2120, and the service center 2130. The service center 2130 may be a call center. In one embodiment, the server 2150 may normalize the building data received from the automation level 216. The management level 218 may be where digital copies of buildings and infrastructure and virtual assets of the buildings reside on the server 2150 and may be viewed on a display of the user interface devices 2120. A user can easily and efficiently operate and manage all of the buildings from a single location, for example, the service center 2130. While three levels of integration are shown as one or more exemplary embodiments of the present disclosure, more or less levels can be utilized.

In one embodiment, the field devices level 214 may include building services equipment 240 and building sensors 220 for each building in a portfolio. The system 200 may utilize the building services equipment 240 and building sensors 220 already present in each of the buildings. However, if desired, additional new building services equipment 240 and building sensors 220 may be installed during installation of the system 200. Building services equipment 240 and building sensors 220 may be well-known and their operation is may be known to those of ordinary skill in the art.

Referring to FIG. 2C, examples of the building sensors 220 may include, for example, electrical system sensors 222, temperature sensors 221, alarm sensors 226, smoke sensors 235, HVAC sensors 236, fluid sensors 223, security system sensors 230, elevator sensors 225, door and gate access sensors 237, video cameras 232, motion sensors 231, sound sensors 234, and location devices 264, but are not limited thereto. Any desired building sensors 220 may be monitored using the system 200. All or a portion of the building sensors 220 may be connected to the network system(s) 2140, which may transmit data received from the building sensors 220 to the sever 2150 to perform the operations of the system 200 in accordance with the present disclosure. In one embodiment, the building sensors 220 connected to the network system(s) 2140 may be remotely monitored and controlled by the server 2150. In one embodiment, the network system(s) 2140 may include local networks established in each of the buildings as well as the internet and telephone network. The local networks may utilize network controllers 211 and router/gateways 205 to connect the local networks to the internet. In some embodiments, use of field device level controllers 239 (see FIG. 2D), automation level controller 210 (see FIG. 2E), or both field device level controller 239 and automation level controller 210 (see FIG. 2F) may be used. Any combination of direct or indirect connections to the network system(s) 2140 and connections containing one or more of the field device level controllers 239 and/or automation level controllers 210 may be utilized for the server 2150 to remotely control and monitor the building services equipment 240 and building sensors 220, as shown, for example, in FIGS. 2C-2F.

Referring to FIG. 2G, examples of the building services equipment 240 may include, for example, electrical equipment 258, heating equipment 243, air conditioning equipment 242, ventilation equipment 248, water equipment 244, gas equipment 245, security systems 257, elevators 254, door access equipment 246, gate access equipment 247, blinds 251, alarms 249, lights 250, communications equipment 253, fire control equipment 256, sewar 259, video equipment 252, and sound equipment 255, but are not limited thereto. Any desired building services equipment 240 may be monitored and controlled using the system 200. The building services equipment 240 may include any IoT enabled device. All or a portion of the building services equipment 240 may be connected to the network system(s) 2140, which may transmit data received from the building sensors 220 to the sever 2150 to perform the operations of the system 200 in accordance with the present disclosure. In one embodiment, the building equipment 240 connected to the network system(s) 2140 may be remotely monitored and controlled by the server 2150. In one embodiment, the network system(s) 2140 may include local networks established in each of the buildings as well as the internet and telephone network. The local networks may utilize network controllers 211 and router/gateways 205 to connect the local networks to the internet. In some embodiments, use of field device level controllers 239 (see FIG. 2H), automation level controller 210 (see FIG. 2I), or both field device level controller 239 and automation level controller 210 (see FIG. 2J) may be used. Any combination of direct or indirect connections to the network system(s) 2140 and connections containing one or more of the field device level controllers 239 and/or automation level controllers 210 may be utilized for the server 2150 to remotely control and monitor the building services equipment 240 and building sensors 220, as shown, for example, in FIGS. 2G-2J.

In one embodiment, the field device level controller(s) 239 may be programmable logic controllers (PLC) so that the field device level controller(s) 239 can be programmed to monitor (collect data from) and control (send commands to) the building services equipment 240 and building sensors 220, as shown in FIGS. 2B, 2D, 2F, 2H, and 2J. More than one field device level controller 239 may be utilized in the same building, and the field device level controller(s) 239 may be connected together by a local network system(s) 2140 in the building using network controllers 211 and router/gateways 205, as shown in FIG. 2B. For example, a commercially available field device level controller 239 may include, but not limited to, a Siemens Synco 700 pre programmable controller.

In one embodiment, the automation level 216 may include the automation level controller(s) 210. The automation level controller(s) 210 may be programmable logic controllers (PLC) so that the automation level controller(s) 210 may be programmed to monitor (collect data from) and control (send commands to) the building services equipment 240 and building sensors 220, as shown in FIGS. 2B, 2E, 2F, 2I, and 2J. More than one automation level controller 210 may be utilized in the same building, and the automation controller(s) 210 may be connected together by a local network system(s) 2140 in the building using network controllers 211 and router/gateways 205, as shown in FIG. 2B. For example, a commercially available automation level controller 210 may include, but not limited to, a Siemens PX free programmable controller.

In one embodiment, at the management level 218, a service (or control) center 2130 may be provided where the control of the server 2150 is operated. The service center 2130 may be a smart service center or a call center. The service center 2130 may be where technicians may communicate with the system 200 using the user interface devices 2120. For example, the technicians may include, but not limited to, specialists in HVAC, IT, security, and utilities such as water, sewar, electrical, and communications.

FIG. 3A illustrates an example building 300 that generates, for example, thousands of data sets daily, such as by heating, ventilation and air conditioning (HVAC), lighting, water metering, air quality monitors, access points, security systems and many additional building components. Generally, the majority of the data is "siloed" by individual building, machine type, and vendor, so that proprietary software is required to utilize and interpret the data. For examples, the building 300 may include energy and water equipment and/or sensors 310, HVAC equipment and/or sensors 320, Elevator equipment and/or sensors 320, and alarm systems equipment and/or sensors 340. The building equipment and/or sensors 310-340 may be produced by a plurality of different manufactures 310*a-n*, 320*a-n*, 330*a-n*, 340*a-n*, for example, Siemens, Johnson Controls, Cisco, Schneider Electric, United Technologies, and Honeywell, but are not limited thereto. Each manufacturer utilizes their own proprietary software for the sensors and controls, and often times different software based on year made and different platforms, as shown, for example, in FIG. 3A. For example, two buildings having Siemens' sensors and controls can have different software platforms. How the building data and commands are transmitted can also vary greatly. For example, the building data and commands may be locked by vendor-specific protocols, not real-time accessible, and/or requires analysis and service by local building engineers. Thus, silo assets (or device, equipment, and/or sensors) may result in significant inefficiencies in building owner's ability to effectively manage their operating costs.

As shown in FIG. 3B, the systems 100 and/or 200 of the present disclosure may provide building data in a far simpler to understand and interpret form, in accordance with aspects of the present disclosure. For example, the systems 100 and 200 may convert the building data shown in FIG. 3A into virtual assets 350 shown in FIG. 3B. The virtual assets may include a boiler 352, current transformer (CT) circuit 354, voltage transformer (VT) circuit 360, an air handling unit (AHU) 356, a fail coil unit (FCU) 358, and a radiant heat unit 362. Additionally, the systems 100 and/or 200 may convert the commands for controlling the building services equipment 240 into the virtual assets 350. Each building services equipment 240 and building sensors 220 of the present disclosure may include an associated virtual asset 350. The virtual asset 350 may be displayed as part of a digital twin(s) of the building(s) being controlled by the systems 100 and/or 200.

FIG. 4A illustrates an exemplary building digital operating system 400 performing remote monitoring and controlling of multiple buildings with a cloud-based application system. The building digital operating system 400 may include one or more buildings 410, a network system(s) 420, a cloud system(s) or server 440, a user interface 430, and a normalization system(s) or engine 460. These components of the building digital operating system 400 may operate similar to the systems 100 and 200 described above. In one embodiment, the building 410 may include buildings sensors and services equipment (e.g., Cameras to Air handling unit controllers 410a) shown in FIG. 4A. The data generated by the building sensors and equipment may be similar to the sensors and equipment described in reference to FIGS. 1A-2J and 3A. In one embodiment, the network system(s) 420 may receive the building data associated with the equipment and sensors from the building 410 at step 401. At step 402, the network system(s) 420 may tag and transmit original equipment manufacturer's (OEM) labels in the building data to the cloud system(s) 440. At step 403, the normalization engine 460 of the cloud system(s) 440 may normalize the tagged OEM labels to generate standardized labels for the building sensor and equipment data.

In one embodiment, the cloud system(s) 440 may normalize different software and how the building data and commands are transmitted into standardized forms. In other words, building data normalization may be a preprocessing technique for data analytics, which helps prevent mismodeling and reduces the complexity inherent in the building data integrated from multiple sources and contexts. For example, normalization may include interpreting and translating the building data streams to and from the building services equipment and building sensors 410a into a standardized building data stream. Additionally or alternatively, normalization may include interpreting and translating the commands sent to the building services equipment and sensors 410a to a standardized command stream. The normalization may be performed by the cloud server 440. The normalization logic can be sent from the cloud network(s) 140 to the field level controllers and automation level controllers (not shown in FIG. 4A for clarity of illustration and explanation, but see, for example, field level controllers 239 and automation level controllers 210) so that these controllers are programmed to control and monitor the building services equipment and sensors 410a connected to the field and automation level controllers. For direct connections between the cloud system(s) 440 and the building services equipment and sensors 410a, the cloud system(s) 440 can directly handle the building data and commands. An examples of normalization process and code is shown in FIG. 4B.

As an example analogy to aid understanding as to how the normalization of the present disclosure may be performed by the cloud server 440, a translator can be used to translate multiple languages into one language, such as English, so that the information being conveyed in the different languages can be understood by a user that only understands a single language, English. In a similar manner, and as an exemplary, non-limited implementation, the cloud system(s) 440 may normalize the building data and control language from the different manufacturers into a single standardized building data and standardized control language that can be understood by the field and automation level controllers and the cloud server 150.

In one embodiment, the OEM labels may be normalized from the original equipment manufacture's (OEM) labels to standardized labels, such as standard system labels (e.g., Kterio or Marketbridge Integrated Service Solutions (MB IS) labels) corresponding to the systems 100, 200, and 400. For example, retagging all of the OEM labels from manufacturers such as, but not limited to, Siemens, Johnson Controls, Cisco, Schneider Electric, United Technologies, and Honeywell, to standard system labels will now allow direct comparison of building data from the different OEM building services equipment and sensors 410a from a large number of buildings. In addition, control of different OEM building services equipment and sensors 410a from a large number of buildings may be simplified.

Still referring to FIG. 4A, at step 404, the normalized OEM labels may be stored in a database in the cloud system(s) 440. The cloud system(s) 440 may then generate a digital twin(s) 450 of the building(s) 410, as shown in FIG. 4C, by utilizing the normalized OEM Labels. The digital twin(s) 450 may include virtual assets 452-459 as shown in FIG. 4C. At step 405, the normalized OEM labels may be visualized on a display of the user interface 430. The virtual assets 452-459 may be a representation of a building asset that can be viewed on a display of the user interface 430. For example, the virtual assets may be represented in graphics that are controllable. The user controllable assets may be, for example, utility metering equipment 452, HVAC chillers 454, elevators 456, fire and life safety equipment 458, security and CCTV equipment 459. Thus, virtual assets 452-459 may include the building sensors and building services equipment as a visual graphic on the display of the user interface 430. The display may be a touch screen. At step 406, touching a virtual asset 452-459 on the display may direct the cloud system(s) 440 to display the status of the underlying building services equipment or building sensor represented by the virtual asset 452-459. The status may include any desired information, such as temperature, flow rates, alarms defaults, problems, or any other desired information. At step 407, the cloud system(s) 440 may transmit appropriate standardized/normalized data or signals generated in response to the user input received on the user interface 430 to the network system(s) 420. At step 408, the network system(s) 420 may then convert the normalized data into appropriate OEM labels and protocols to control the appropriate building services equipment and/or sensors 410a of the building(s) 410.

In one embodiment, the cloud system(s) 440 may be configured to utilize algorithms to reduce false alarms from the building equipment services and sensors 410a. Additionally or alternatively, artificial intelligence may be utilized. False alarms are very costly. Typically, the manufacturer of the controls and sensors have service contracts with the building owner. Generally, when an alarm is raised, the manufacturer would need to send a technician to the building to handle the alarm. Accordingly, false alarms usually result in large unnecessary costs. In accordance with embodiments of the present disclosure, when the systems 100, 200, 400 determine that the alarm is false, often times the systems 100, 200, 400 can reset the building services equipment and sensors 410a, for example, by resetting the speed of a pump, resetting the elevator, resetting the temperature, resetting the air flow rate, and the like.

Referring to FIGS. 4D-G, these figures illustrate various examples of how the systems 100, 200, and 400 may be installed, in accordance with aspects of the present disclosure. FIG. 4H illustrates an example implementation and features of a service center in the systems 100, 200, and 400, in accordance with various aspects of the present disclosure. FIG. 4I illustrates an example of the timeline for installing the systems 100, 200, and 400, in accordance with various aspects of the present disclosure.

The methods described hereinafter, by utilizing the systems 100, 200, and 400 described above, solve the aforementioned technological problems arising in the conventional entity/system management services technology. That is, the systems and methods of the present disclosure described herein are directed to an improvement in the conventional entity/system management services technical field and are practically applicable in the field of connecting, remotely monitoring and controlling systems and devices across multiple entities with cloud-based technology.

FIG. 5 illustrates a flowchart of an exemplary method 500 for executing various operations for connecting, remotely monitoring, and controlling multiple entities using a cloud-based platform. Exemplary process flows of the method 500, performed in accordance with systems 100, 200, and 400 above, are described hereinafter.

In one embodiment, at step 502, a cloud server comprising a digital twin generation system may be provided. The cloud server may be connected to a network system. At step 504, a first entity may be connected to the network system. The first entity may include first equipment and a first sensor. At step 506, a data system may be provided to be connected between the network system and the cloud server. At step 508, the data system may receive first equipment data and first sensor data from the first entity via the network system. At step 510, the data system may generate tagged first equipment data and tagged first sensor data. At step 512, by the data system may transmit the tagged first equipment data and the tagged first sensor data to the cloud server. At step 514, the cloud server may normalize the tagged first equipment data and the tagged first sensor data by converting the tagged first equipment and the tagged first sensor data into standardized first equipment data and standardized first sensor data. At step 516, the digital twin generation system may generate a first digital representation of the first entity based on the standardized first equipment data and the standardized first sensor data. At step 518, the cloud server may transmit display data of the first digital representation to a user interface.

In one embodiment, a second entity to the network system, the second entity including second equipment and a second sensor. The data system may receive second equipment data and second sensor data from the second entity via the network system. The data system may generate tagged second equipment data and tagged second sensor data. The data system may transmit the tagged second equipment data and the tagged second sensor data to the cloud server. The cloud server may normalize the tagged second equipment data and the tagged second sensor data by converting the tagged second equipment and the tagged second sensor data into standardized second equipment data and standardized second sensor data. The digital twin generation system may generate a second digital representation of the second entity based on the standardized second equipment data and the standardized second sensor data. The cloud server may transmit display data of the second digital representation to the user interface.

In one embodiment, an identification language of the first equipment data may be different from an identification language of the second equipment data. The standardized first equipment data and the standardized second equipment data have an identical identification language.

In one embodiment, the identification language of the first equipment data may be associated with a first manufacturer. The identification language of the second equipment data is associated with a second manufacturer.

In one embodiment, by the cloud server may receive a first equipment control signal from the user interface. The cloud server may transmit the first equipment control signal, via the network system, to the first equipment. The first equipment may execute an operation based on the first equipment control signal.

In one embodiment, the cloud server may determine a status of the first sensor based on the standardized first sensor data. The cloud server may generate an updated display data of the first digital representation. The cloud server may transmit the updated display data of the first digital representation to the user interface.

In one embodiment, normalizing the tagged first equipment data and the tagged first sensor data may include utilizing artificial intelligence to convert the tagged first equipment and the tagged first sensor data into standardized first equipment data and standardized first sensor data.

FIGS. 6A and 6B illustrate another method 600 for executing various operations for connecting, remotely monitoring, and controlling multiple entities using a cloud-based platform using the systems 100, 200 and 400. The order of the steps described therein and/or recited in the attached claims can be changed as desired unless otherwise stated.

The majority of buildings already have an existing building network to which the building services equipment 240 and building sensors 220 are connected. The existing building network can include field level controllers 239. When the building has an existing network system(s) 2140, the server 2150 can be connected to the existing network system(s) 2140 by the automation level controller 210 and/or directly connected.

Some buildings may have no network system or only a partial network connected to the building services equipment 240 and building sensors 220. In those instances field level controllers 239 and/or network controllers 211 can be installed in the building as required for the particular application to fully connect the building services equipment 240 and building sensors 220 to the network system(s) 2140 and the server 2150.

In some instances, a building network may not be necessary and the building services equipment 240 and building sensors 220 can be provided with a virtual private network VPN in communication with the internet (network system(s) 2140) to connect to the server 2150.

EXAMPLE 1

A prototype system 100, 200, or 400 may be launched to bring enterprise-grade analytics solutions into the rapidly growing digital real estate management market. The system 100, 200, or 400 may be built on the latest cloud and IoT technologies to provide powerful analytics and machine learning capabilities. The system 100, 200, or 400 helps large property owners and their tenants take full control of their building assets, provide a better work environment, improve sustainable business practices, and save money. The system 100, 200, or 400 is highly disruptive since no other integrated technology exists that can unlock multiple building systems, un-silo proprietary protocols and remotely automate property and asset management functionality with real-time, 24/7 monitoring and read write capability. Artificial intelligence (AI) and machine learning (ML) may be incorporated to significantly reduce costs and manage risk. The system 100, 200, 400 may provide monitoring of the building equipment services 240 and building sensors 220 and reports real-time building performance for owners and tenants. The system 100, 200, or 400 enables problem identification and rapid responses from the technicians. The system 100, 200, or 400 may aggregate 1000s of asset performance data points (signals) across all equipment vendors. The system 100, 200, or 400 may automate building maintenance and tenant on-boarding.

EXAMPLE 2

A controller may be commissioned by Siemens/JCI for specific building equipment services 240 and building sensors 220. Labels may be written in code according to original equipment manufacturer (OEM) specifications, i.e. Siemens/JCI specifications. Labels, specific code/strategy, was saved within the controller/PLC. The controller/PC may be located on a local area network 2140, i.e. BACnet, LON. BACnet is a data communication protocol for building automation and control networks, www.backnet.org. A gateway 205 (e.g., Kterio or Marketbridge Integrated Service Solutions (MB IS) gateway) with pre-installed software may be located on the same LAN as the controllers. A gateway 205 may map the controllers and all points within the controllers. Points can be parameters, I/O, time schedules and any other building data. The building data may be sent to servers 2150 (e.g., Kterio or Marketbridge Integrated Service Solutions (MB IS) servers). The servers 2150 may be filtered for usable points and then sent the building data to an engineering team for normalization. i.e. re-labelling in a standard language across all of the systems. All usable points may then be viewed within cloud application for monitoring, analytics, reporting, analysis and services. This process can be carried out on any system using software, servers and application (e.g., Kterio or Marketbridge Integrated Service Solutions (MB ISS) software, servers, and application).

Another embodiment of the disclosure relates to a computer program code (software). The computer program product comprises a computer usable medium having a computer readable program code embodied therein, wherein the computer readable program code being constructed to be executed to control the system 100 and implement the method of remotely monitoring and controlling a plurality of buildings.

Computer usable medium are well known, and any medium capable of storing the computer program code can be used. Non-limiting examples of the computer usable medium include semiconductor, magnetic disk, optical disk (e.g., CD-ROM, DVD-ROM, etc.), USB drives, SIM cards, and as a computer data signal embodied in a computer usable (e.g., readable) transmission medium (e.g., carrier wave or any other medium including digital, optical, or analog-based medium). As such, the software can be transmitted over communication networks including the Internet and intranets.

"A" or "an" means "at least one" or "one or more" unless otherwise indicated.

"Comprise", "have", "include" and "contain" (and their variants) are open-ended linking verbs and allow the addition of other elements when used in a claim.

Use of "is" and "the" in the description are non-limiting in regard to the claims and are only used to describe the exemplary screenshots as being currently produced according to the present disclosure.An embodiment or implementation described in this disclosure as "exemplary" is not to be construed as preferred or advantageous, for example, over other embodiments or implementations; rather, it is intended to reflect or indicate that the embodiment(s) is/are "example" embodiment(s). Subject matter can be embodied in a variety of different forms and, therefore, covered or claimed subject matter is intended to be construed as not being limited to any exemplary embodiments set forth herein; exemplary embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware, or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of exemplary embodiments in whole or in part.

The terminology used in this disclosure may be interpreted in its broadest reasonable manner, even though it is being used in conjunction with a detailed description of certain specific examples of the present disclosure. Indeed, certain terms may even be emphasized; however, any terminology intended to be interpreted in any restricted manner will be overtly and specifically defined as such in this Detailed Description section. The foregoing descriptions are exemplary and explanatory only and are not restrictive of the features, as claimed.

In this disclosure, the term "based on" means "based at least in part on." The singular forms "a," "an," and "the" include plural referents unless the context dictates otherwise. The term "exemplary" is used in the sense of "example" rather than "ideal." The term "or" is meant to be inclusive and means either, any, several, or all of the listed items. The terms "comprises," "comprising," "includes," "including," or other variations thereof, are intended to cover a non-exclusive inclusion such that a process, method, or product that comprises a list of elements does not necessarily include only those elements, but may include other elements not expressly listed or inherent to such a process, method, article, or apparatus. While the disclosure has been described with reference to particular embodiments, it will be understood by those skilled in the art that various changes may be made and equivalents may be substituted for elements thereof without departing from the scope of the disclosure. In addition, many modifications may be made to adapt a particular situation or material to the teachings of the disclosure without departing from the scope of the disclosure.

Therefore, it is intended that the disclosure not be limited to the particular embodiments disclosed as the best mode contemplated for carrying out this disclosure, but that the disclosure will include all embodiments falling within the scope and spirit of the appended claims.

What is claimed is:

1. A method of executing remote monitoring and controlling of a plurality of entities using a cloud-based platform, the method comprising:

> providing a cloud server comprising a digital twin generation system, the cloud server being connected to a network system;
>
> connecting a first entity to the network system, the first entity including first equipment and a first sensor;
>
> providing a data system connected between the network system and the cloud server;
>
> receiving, by the data system, first equipment data and first sensor data from the first entity via the network system;
>
> generating, by the data system, tagged first equipment data and tagged first sensor data;
>
> transmitting, by the data system, the tagged first equipment data and the tagged first sensor data to the cloud server;
>
> normalizing, by the cloud server, the tagged first equipment data and the tagged first sensor data by converting the tagged first equipment data and the tagged first sensor data into standardized first equipment data and standardized first sensor data;
>
> generating, by the digital twin generation system, a first digital representation of the first entity based on the standardized first equipment data and the standardized first sensor data; and
>
> transmitting, by the cloud server, display data of the first digital representation to a user interface;
>
> wherein the tagged first equipment and tagged first sensor data comprise a building identifier, a floor identifier, a sub-location identifier, a system type, and an asset type identifier.

2. The method of claim 1, further comprising: connecting a second entity to the network system, the second entity including second equipment and a second sensor; receiving, by the data system, second equipment data and second sensor data from the second entity via the network system; generating, by the data system, tagged second equipment data and tagged second sensor data; transmitting, by the data system, the tagged second equipment data and the tagged second sensor data to the cloud server; normalizing, by the cloud server, the tagged second equipment data and the tagged second sensor data by converting the tagged second equipment data and the tagged second sensor data into standardized second equipment data and standardized second sensor data; generating, by the digital twin generation system, a second digital representation of the second entity based on the standardized second equipment data and the standardized second sensor data; and transmitting, by the cloud server, display data of the second digital representation to the user interface.

3. The method of claim 2, wherein an identification language of the first equipment data is different from an identification language of the second equipment data, and wherein the standardized first equipment data and the standardized second equipment data have an identical identification language.

4. The method of claim 3, wherein the identification language of the first equipment data is associated with a first manufacturer, and wherein the identification language of the second equipment data is associated with a second manufacturer.

5. The method of claim 1, further comprising: receiving, by the cloud server, a first equipment control signal from the user interface; transmitting, by the cloud server, the first equipment control signal, via the network system, to the first equipment; and executing, by the first equipment, an operation based on the first equipment control signal.

6. The method of claim 1, further comprising: determining, by the cloud server, a status of the first sensor based on the standardized first sensor data; generating, by the cloud server, an updated display data of the first digital representation; and transmitting, by the cloud server, the updated display data of the first digital representation to the user interface.

7. The method of claim 1, wherein normalizing the tagged first equipment data and the tagged first sensor data further comprise utilizing artificial intelligence to convert the tagged first equipment data and the tagged first sensor data into standardized first equipment data and standardized first sensor data.

8. A system comprising:

> a cloud server comprising a digital twin generation system;
>
> a network system connected to the cloud server;
>
> a data system connected between the network system and the cloud server;
>
> one or more computer readable media storing instructions for executing remote monitoring and controlling of a plurality of entities using a cloud-based platform; and
>
> one or more processors configured to execute the instructions to perform operations comprising:
>
>> connecting a first entity to the network system, the first entity including first equipment and a first sensor;
>>
>> receiving, by the data system, first equipment data and first sensor data from the first entity via the network system;
>>
>> generating, by the data system, tagged first equipment data and tagged first sensor data;
>>
>> transmitting, by the data system, the tagged first equipment data and the tagged first sensor data to the cloud server;
>>
>> normalizing, by the cloud server, the tagged first equipment data and the tagged first sensor data by converting the tagged first equipment data and the tagged first sensor data into standardized first equipment data and standardized first sensor data;
>>
>> generating, by the digital twin generation system, a first digital representation of the first entity based on the standardized first equipment data and the standardized first sensor data; and
>>
>> transmitting, by the cloud server, display data of the first digital representation to a user interface;
>>
>> wherein the tagged first equipment and tagged first sensor data comprise a building identifier, a floor identifier, a sub-location identifier, a system type, and an asset type identifier.

9. The system of claim 8, the operations further comprising: connecting a second entity to the network system, the second entity including second equipment and a second sensor; receiving, by the data system, second equipment data and second sensor data from the second entity via the network system; generating, by the data system, tagged second equipment data and tagged second sensor data;

transmitting, by the data system, the tagged second equipment data and the tagged second sensor data to the cloud server; normalizing, by the cloud server, the tagged second equipment data and the tagged second sensor data by converting the tagged second equipment data and the tagged second sensor data into standardized second equipment data and standardized second sensor data; generating, by the digital twin generation system, a second digital representation of the second entity based on the standardized second equipment data and the standardized second sensor data; and transmitting, by the cloud server, display data of the second digital representation to a user interface.

10. The system of claim 9, wherein an identification language of the first equipment data is different from an identification language the second equipment data, and wherein the standardized first equipment data and the standardized second equipment data have an identical identification language.

11. The system of claim 10, wherein the identification language of the first equipment data is associated with a first manufacturer, and wherein the identification language of the second equipment data is associated with a second manufacturer.

12. The system of claim 8, the operations further comprising: receiving, by the cloud server, a first equipment control signal from the user interface; transmitting, by the cloud server, the first equipment control signal, via the network system, to the first equipment; and executing, by the first equipment, an operation based on the first equipment control signal.

13. The system of claim 8, the operations further comprising: determining, by the cloud server, a status of the first sensor based on the standardized first sensor data; generating, by the cloud server, an updated display data of the first digital representation; and transmitting, by the cloud server, the updated display data of the first digital representation to the user interface.

14. The system of claim 8, wherein normalizing the tagged first equipment data and the tagged first sensor data further comprise utilizing artificial intelligence to convert the tagged first equipment data and the tagged first sensor data into standardized first equipment data and standardized first sensor data.

15. A non-transitory computer-readable medium storing instructions for executing remote monitoring and controlling of a plurality of entities using a cloud-based platform, the instructions, when executed by one or more processors, causing the one or more processors to perform operations comprising:

connecting a cloud server comprising a digital twin generation system to a network system;

connecting a first entity to the network system, the first entity including first equipment and a first sensor;

connecting a data system between the network system and the cloud server;

receiving, by the data system, first equipment data and first sensor data from the first entity via the network system;

generating, by the data system, tagged first equipment data and tagged first sensor data;

transmitting, by the data system, the tagged first equipment data and the tagged first sensor data to the cloud server;

normalizing, by the cloud server, the tagged first equipment data and the tagged first sensor data by converting the tagged first equipment data and the tagged first sensor data into standardized first equipment data and standardized first sensor data;

generating, by the digital twin generation system, a first digital representation of the first entity based on the standardized first equipment data and the standardized first sensor data; and transmitting, by the cloud server, display data of the first digital representation to a user interface;

wherein the tagged first equipment and tagged first sensor data comprise a building identifier, a floor identifier, a sub-location identifier, a system type, and an asset type identifier.

16. The non-transitory computer-readable medium of claim 15, the operations further comprising: connecting a second entity to the network system, the second entity including second equipment and a second sensor; receiving, by the data system, second equipment data and second sensor data from the second entity via the network system; generating, by the data system, tagged second equipment data and tagged second sensor data; transmitting, by the data system, the tagged second equipment data and the tagged second sensor data to the cloud server; normalizing, by the cloud server, the tagged second equipment data and the tagged second sensor data by converting the tagged second equipment data and the tagged second sensor data into standardized second equipment data and standardized second sensor data; generating, by the digital twin generation system, a second digital representation of the second entity based on the standardized second equipment data and the standardized second sensor data; and transmitting, by the cloud server, display data of the second digital representation to a user interface.

17. The non-transitory computer-readable medium of claim 16, wherein an identification language of the first equipment data is different from an identification language the second equipment data, and wherein the standardized first equipment data and the standardized second equipment data have an identical identification language.

18. The non-transitory computer-readable medium of claim 15, the operations further comprising: receiving, by the cloud server, a first equipment control signal from the user interface; transmitting, by the cloud server, the first equipment control signal, via the network system, to the first equipment; and executing, by the first equipment, an operation based on the first equipment control signal.

19. The non-transitory computer-readable medium of claim 15, the operations further comprising: determining, by the cloud server, a status of the first sensor based on the standardized first sensor data; generating, by the cloud server, an updated display data of the first digital representation; and transmitting, by the cloud server, the updated display data of the first digital representation to the user interface.

20. The non-transitory computer-readable medium of claim 15, wherein normalizing the tagged first equipment data and the tagged first sensor data further comprise utilizing artificial intelligence convert the tagged first equipment data and the tagged first sensor data into standardized first equipment data and standardized first sensor data.

* * * * *